United States Patent [19]

Kirsch et al.

[11] 4,379,335
[45] Apr. 5, 1983

[54] ELECTRONIC CONTROLLER AND PORTABLE PROGRAMMER SYSTEM FOR A PNEUMATICALLY-POWERED POINT-TO-POINT ROBOT

[75] Inventors: Kerry F. Kirsch, Livonia; Kirk R. Stauffer, Royal Oak; Robert J. Tindall, Troy, all of Mich.

[73] Assignee: Auto-Place, Inc., Troy, Mich.

[21] Appl. No.: 202,013

[22] Filed: Oct. 28, 1980

[51] Int. Cl.³ .................... G06F 15/46; G05B 19/42
[52] U.S. Cl. .................... 364/513; 318/568; 364/192; 364/193
[58] Field of Search ............... 364/513, 474, 478, 171, 364/191–193; 318/568

[56] References Cited

U.S. PATENT DOCUMENTS

| | | |
|---|---|---|
| 3,661,051 | 5/1972 | Dunne et al. . |
| 3,828,318 | 8/1974 | Bennett et al. . |
| 3,898,438 | 8/1975 | Nater et al. . |
| 3,909,600 | 9/1975 | Hohn . |
| 3,920,972 | 11/1975 | Corwin, Jr. et al. .......... 364/513 X |
| 4,010,356 | 3/1977 | Evans et al. . |
| 4,021,651 | 5/1977 | Mitsuhashi et al. . |
| 4,025,838 | 5/1977 | Watanabe ................ 364/513 X |
| 4,045,660 | 8/1977 | Weisgerber et al. . |
| 4,064,395 | 12/1977 | Schubeler et al. . |
| 4,074,350 | 2/1978 | Roch et al. . |
| 4,085,691 | 4/1978 | Coughenour et al. . |
| 4,092,938 | 6/1978 | Coughenour et al. . |
| 4,104,976 | 8/1978 | Landau, Jr. et al. . |
| 4,135,239 | 1/1979 | Hamill et al. . |
| 4,140,953 | 2/1979 | Dunne . |
| 4,144,827 | 3/1979 | Brown . |
| 4,149,235 | 4/1979 | Froyd et al. . |
| 4,152,765 | 5/1979 | Weber . |
| 4,163,183 | 7/1979 | Engelberger et al. . |
| 4,163,284 | 7/1979 | Kishi et al. . |
| 4,178,632 | 12/1979 | Anthony . |
| 4,199,814 | 4/1980 | Rapp et al. ................ 364/192 X |

Primary Examiner—Joseph F. Ruggiero
Attorney, Agent, or Firm—Harness, Dickey & Pierce

[57] ABSTRACT

An electronic controller and portable programmer system for a pneumatically-powered point-to-point robot is disclosed. The microprocessor-based controller includes a read-only memory for storing the main control program, a non-volatile memory (EAROM) for storing a sequence of robot functions forming a user program, an output interface for transmitting control signals to the robot solenoid values, and an input interface for receiving feedback pressure signals to indicate that the various robot functions have been completed. The portable programmer provides a teach control unit, which is used to enter, edit, and test the user program. The teach control unit includes a matrix keyboard, a display, circuit means for decoding the keyboard and driving the display, and an interface for providing serial communication with the controller.

25 Claims, 37 Drawing Figures

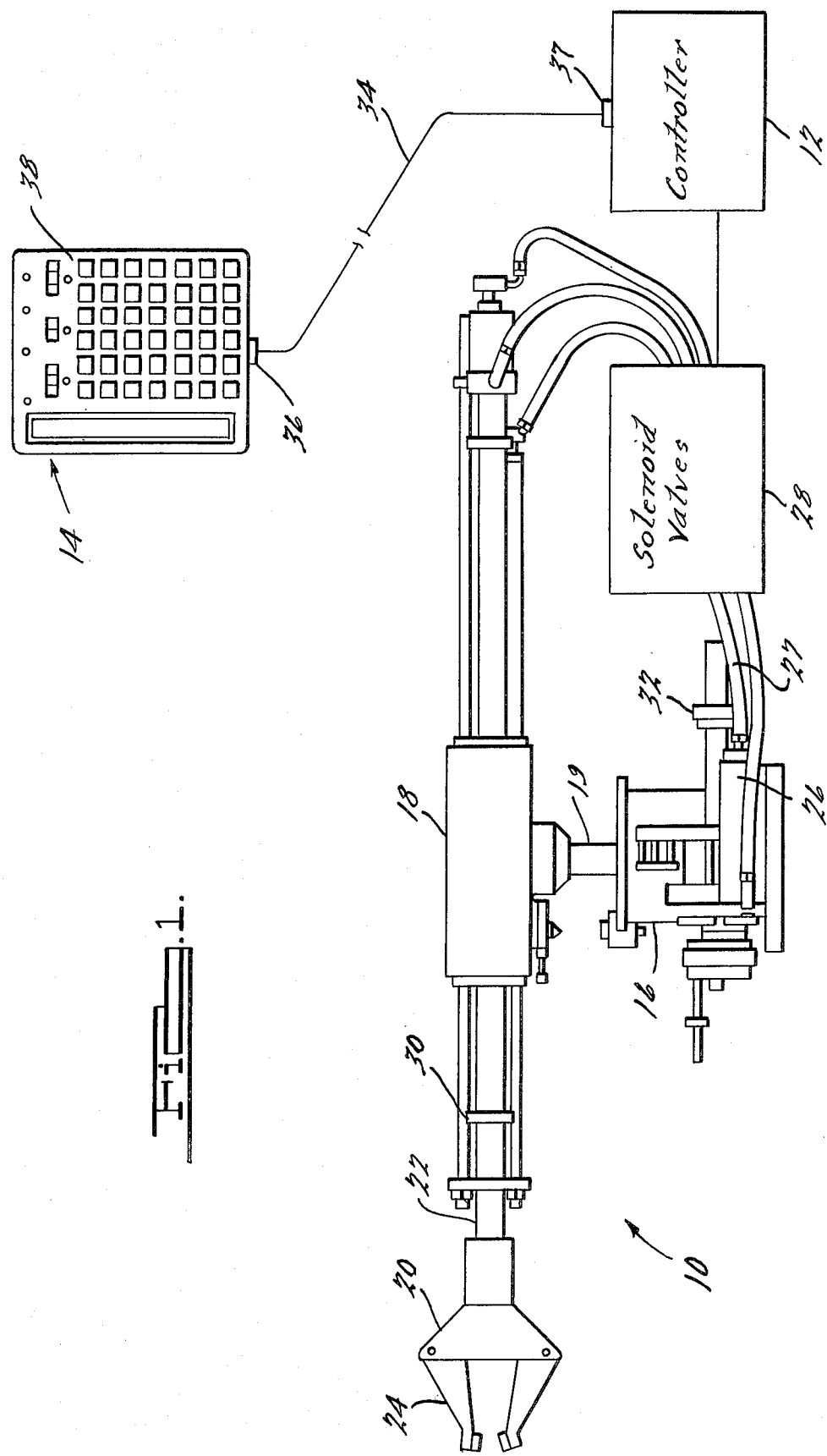

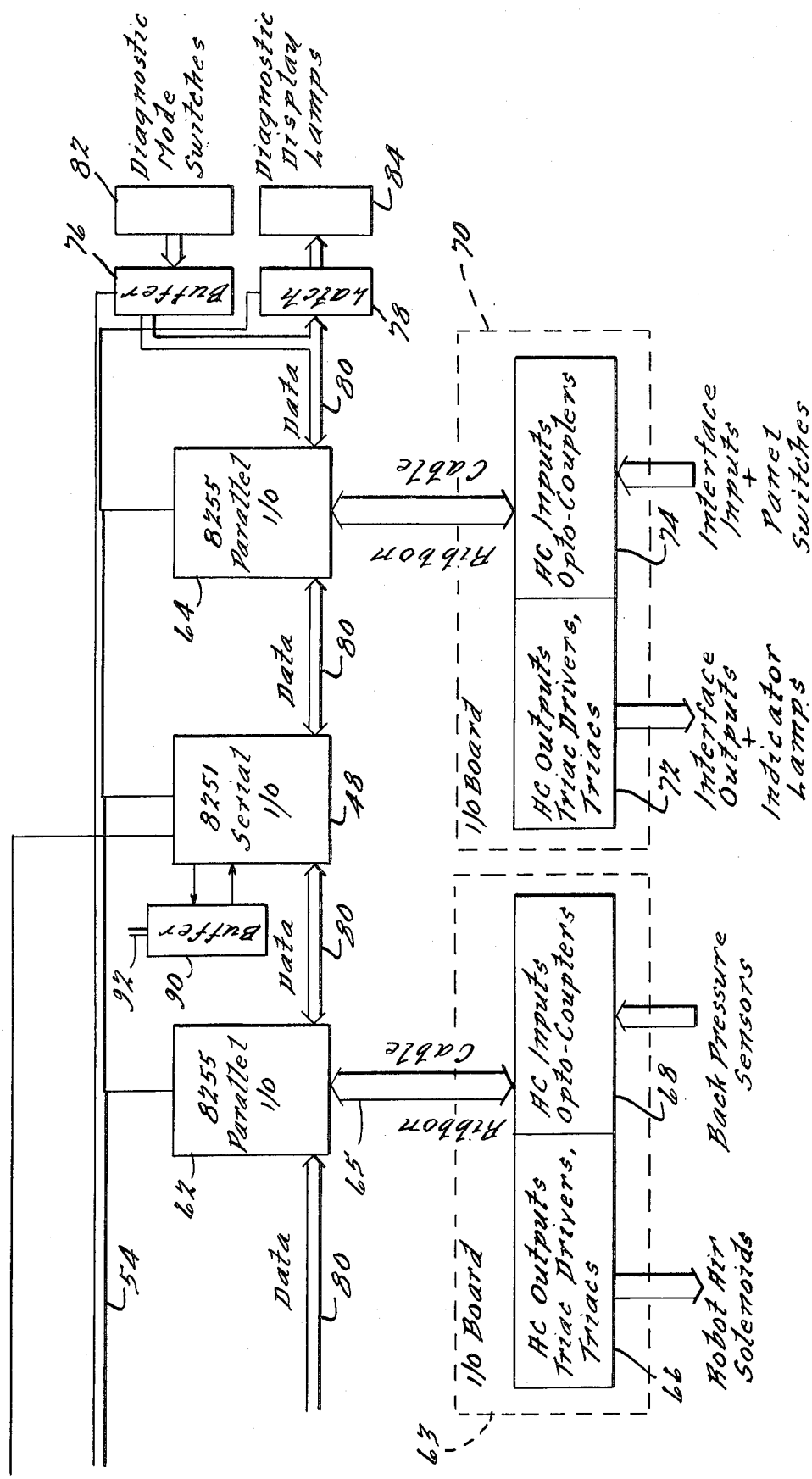
Fig. 2.b.

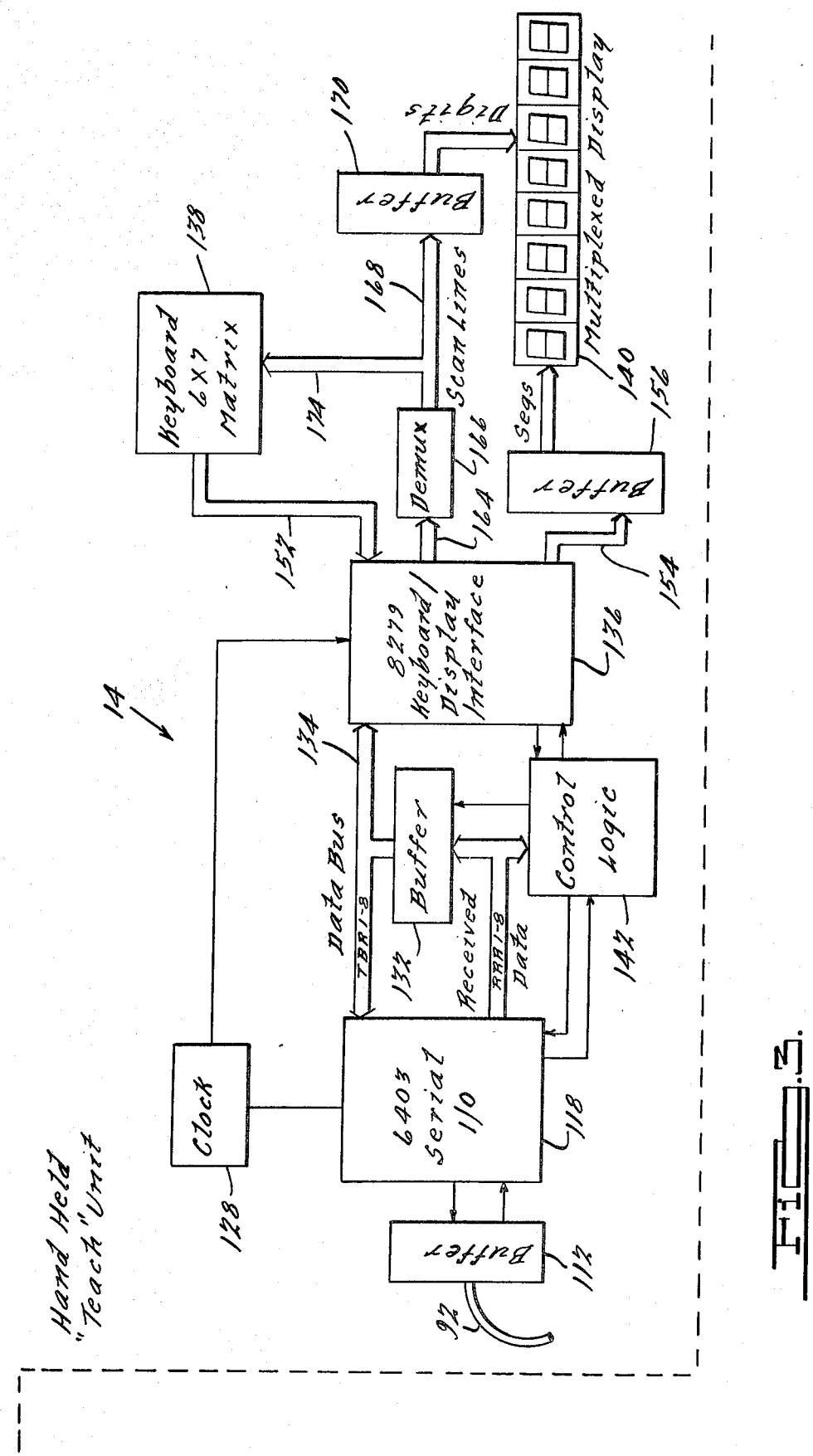

FIG. 4a.

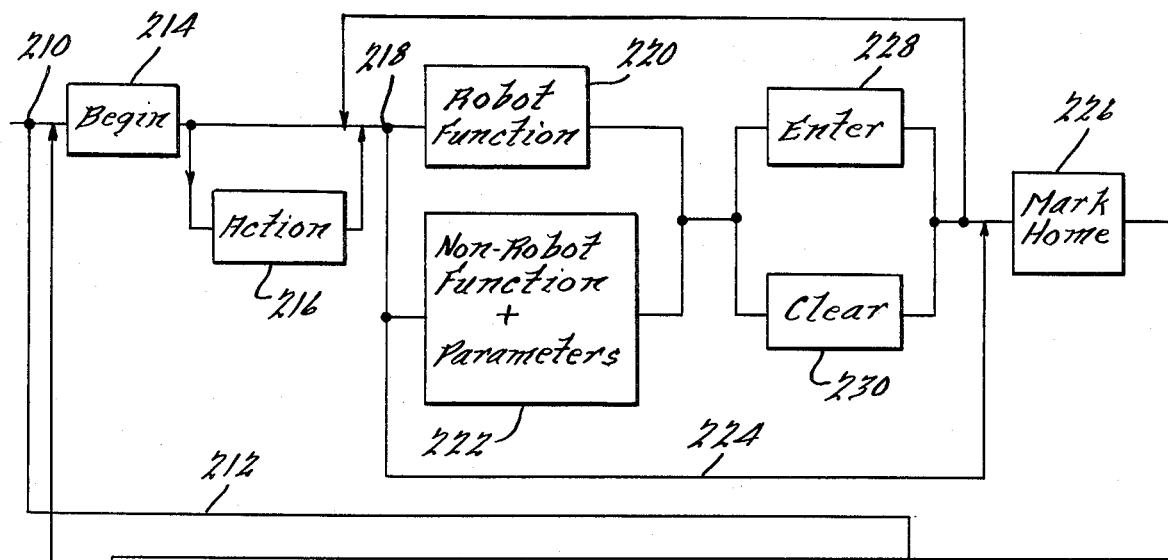
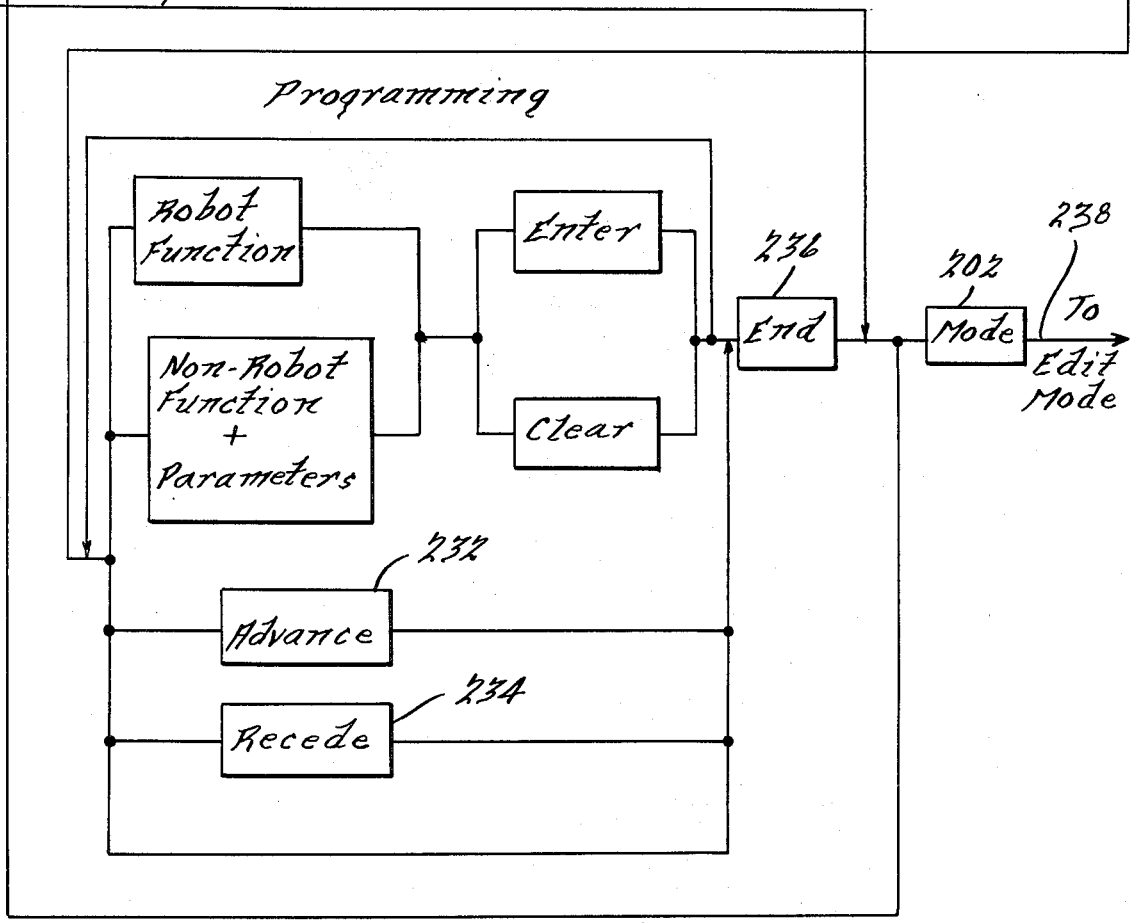
FIG. 7.

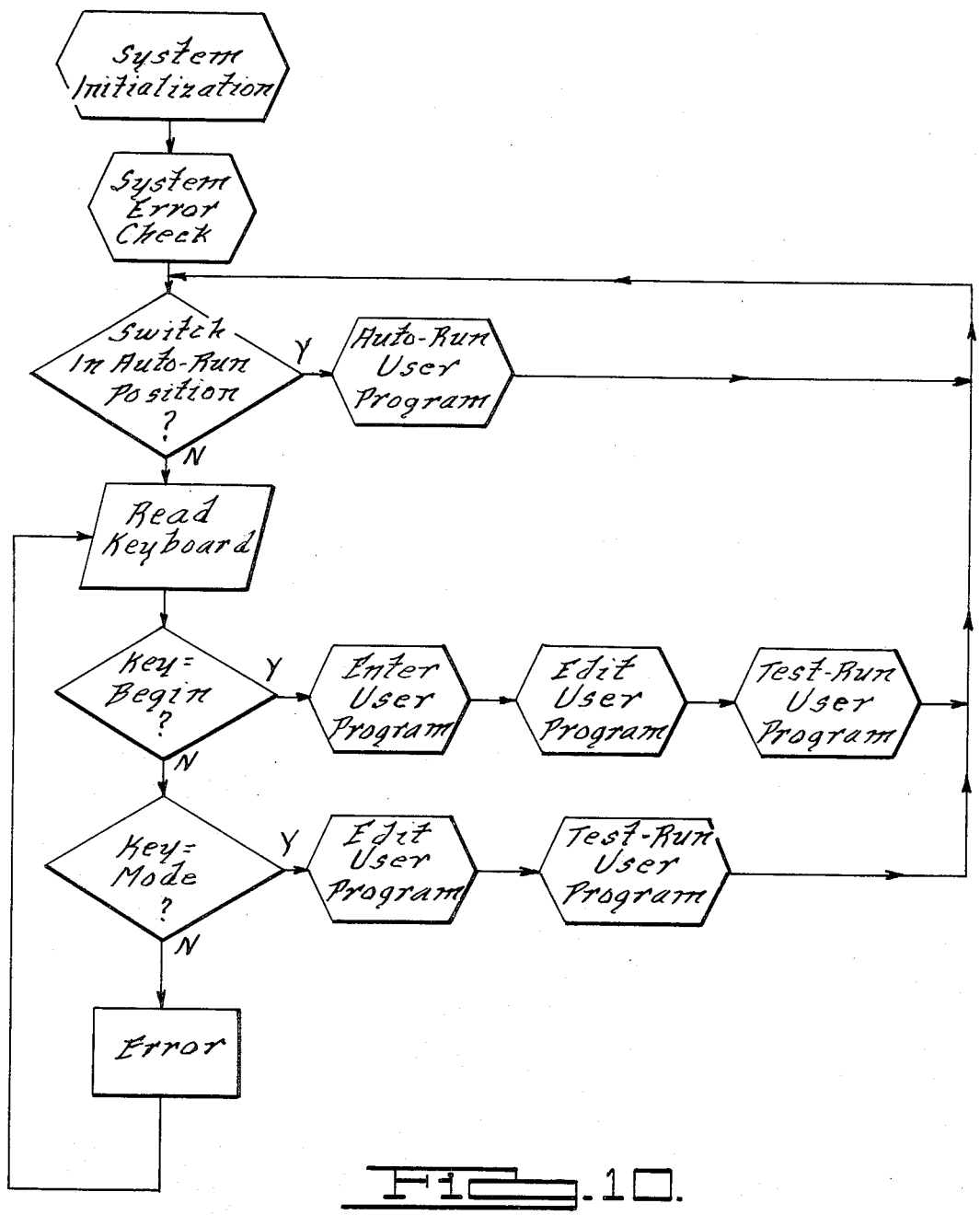

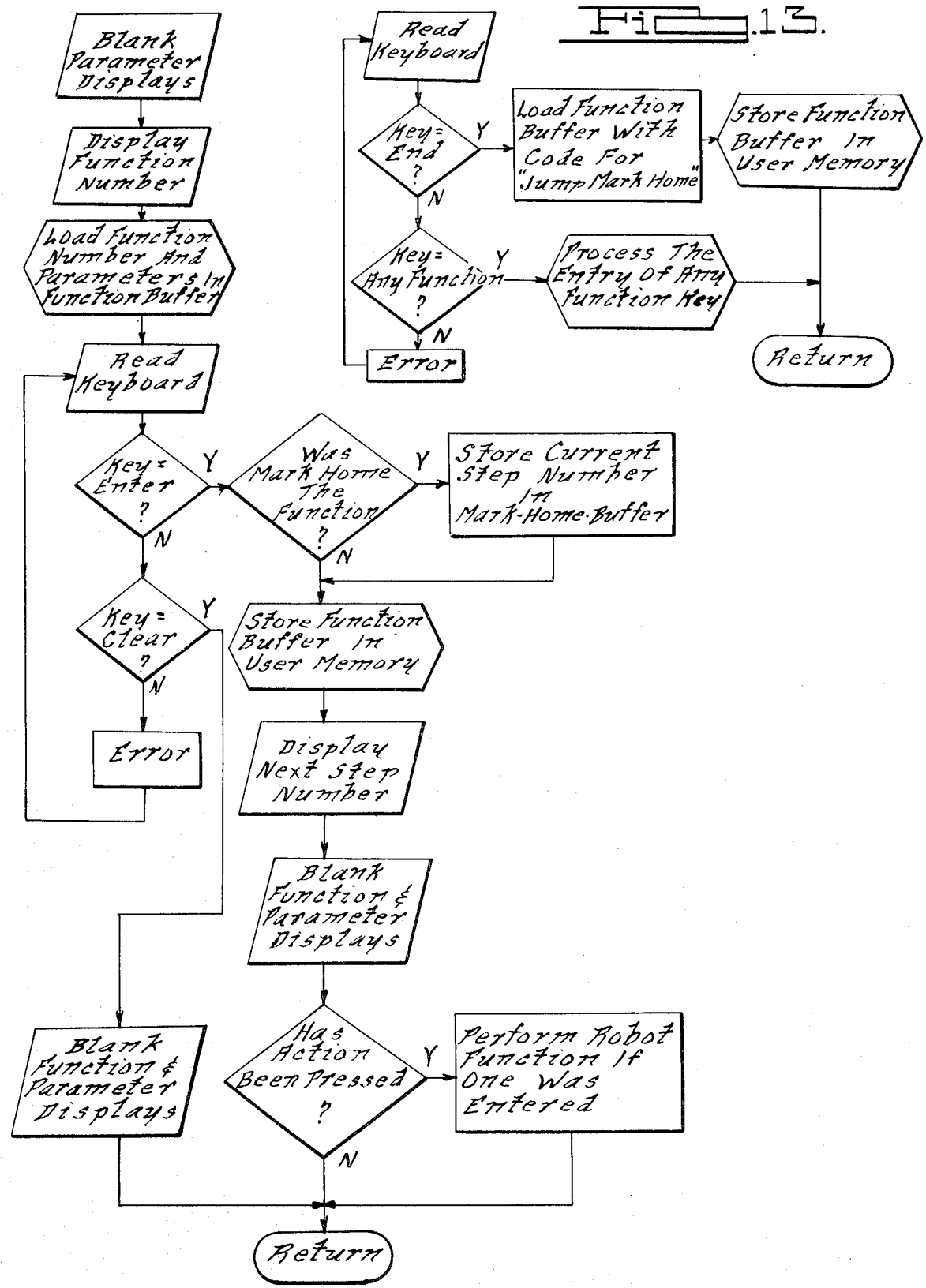

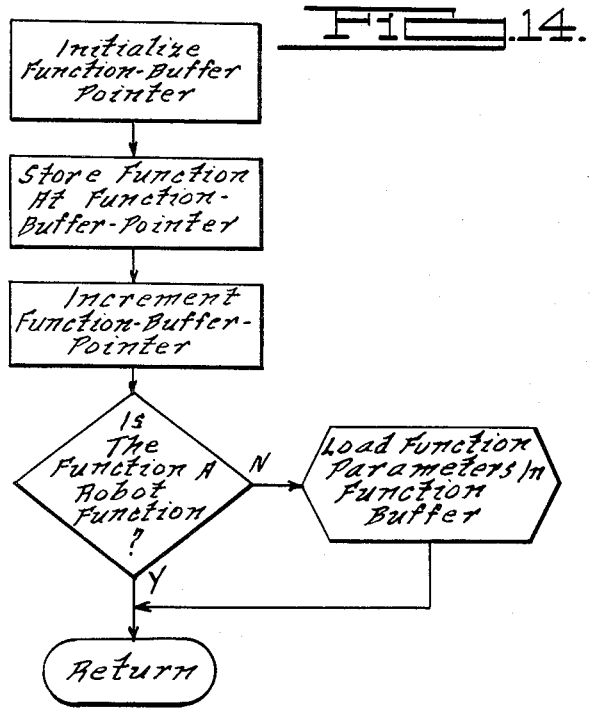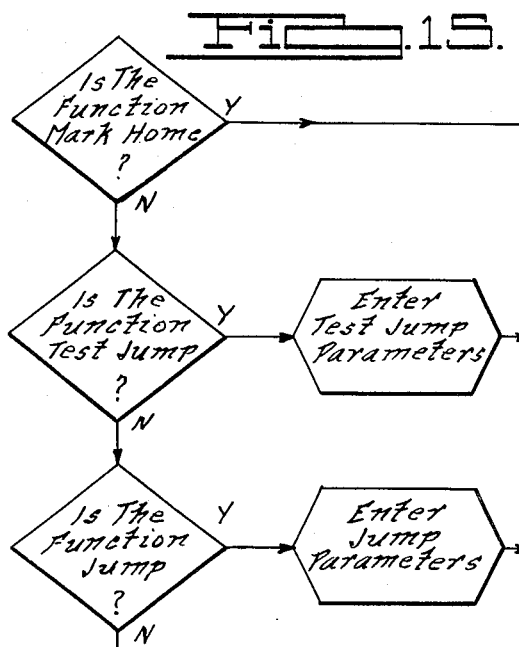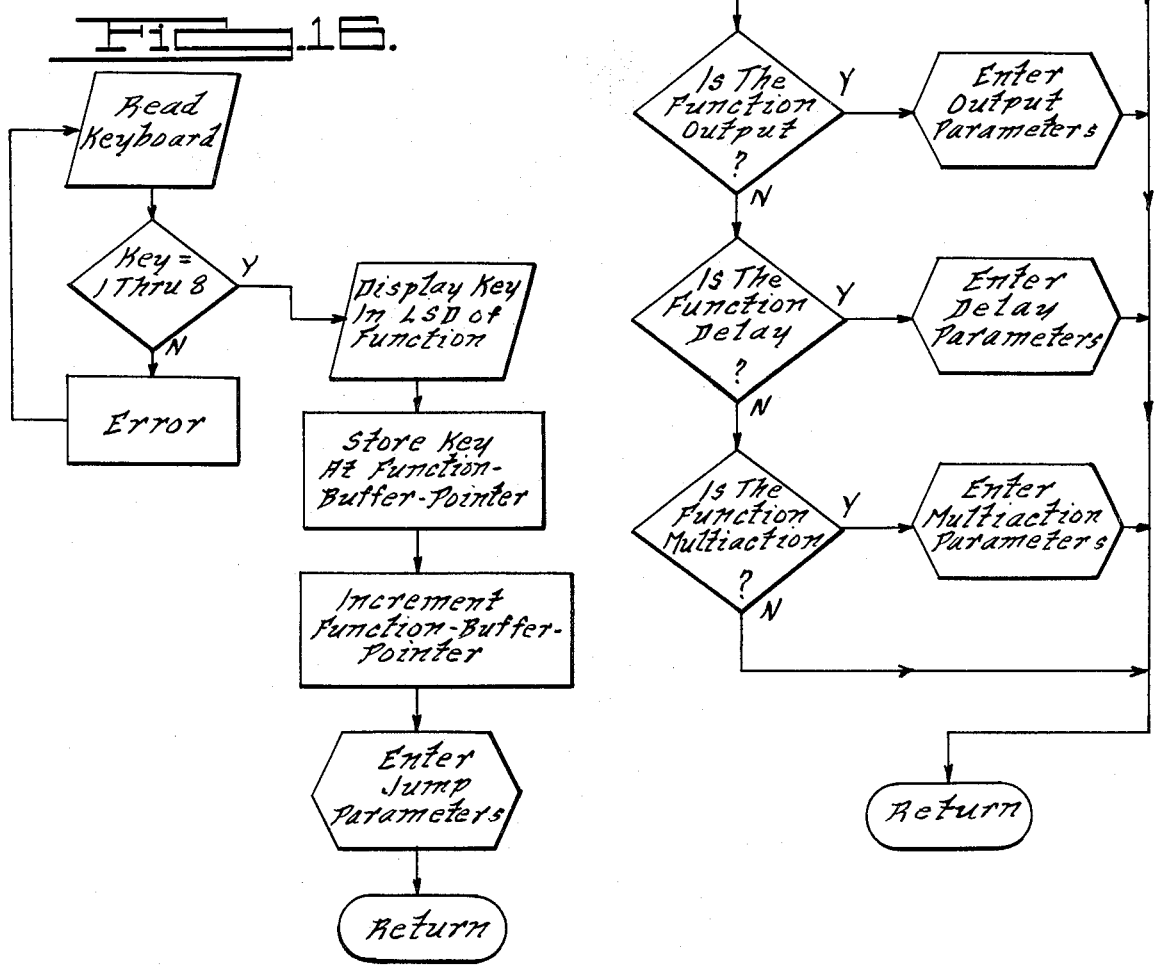

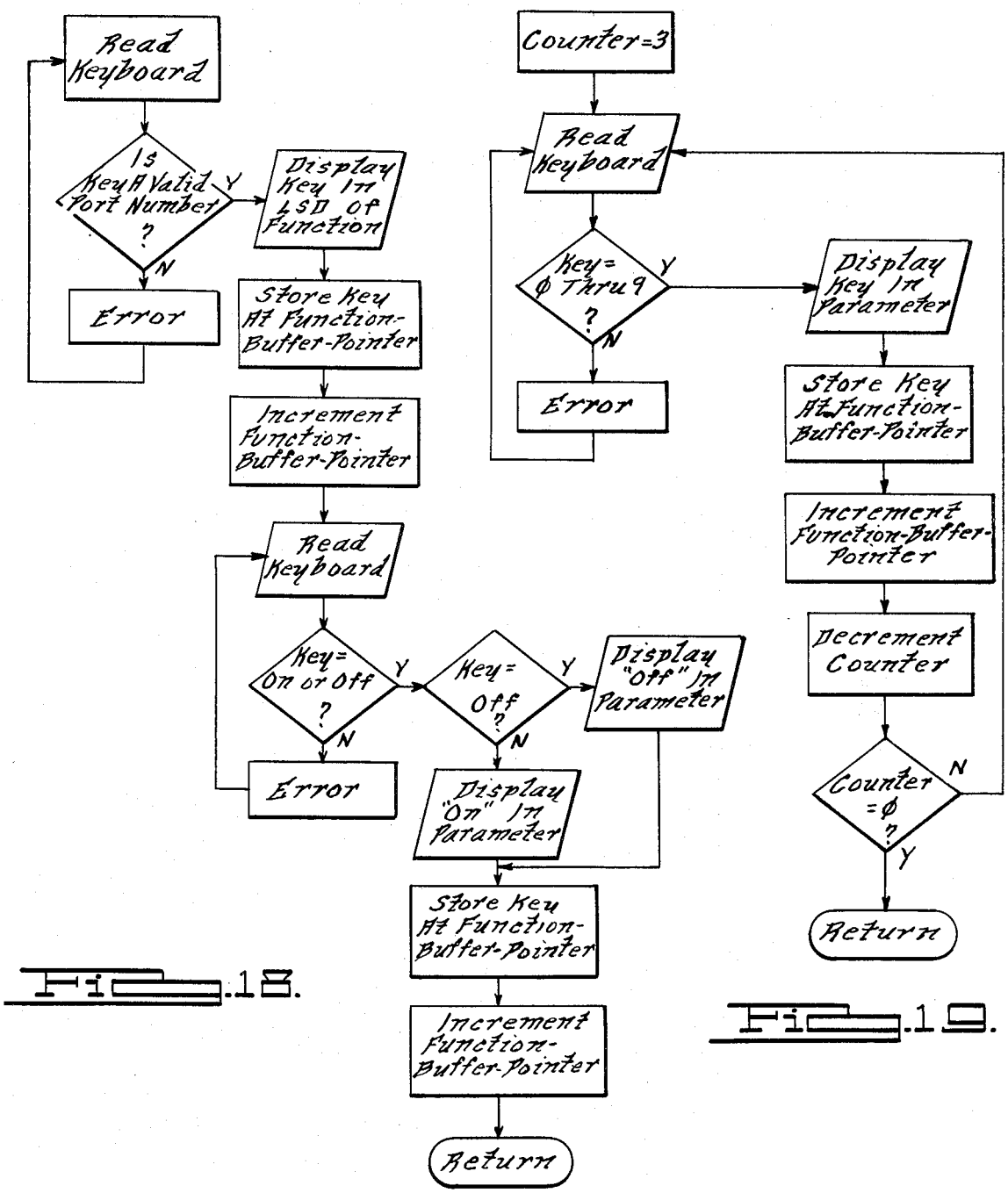

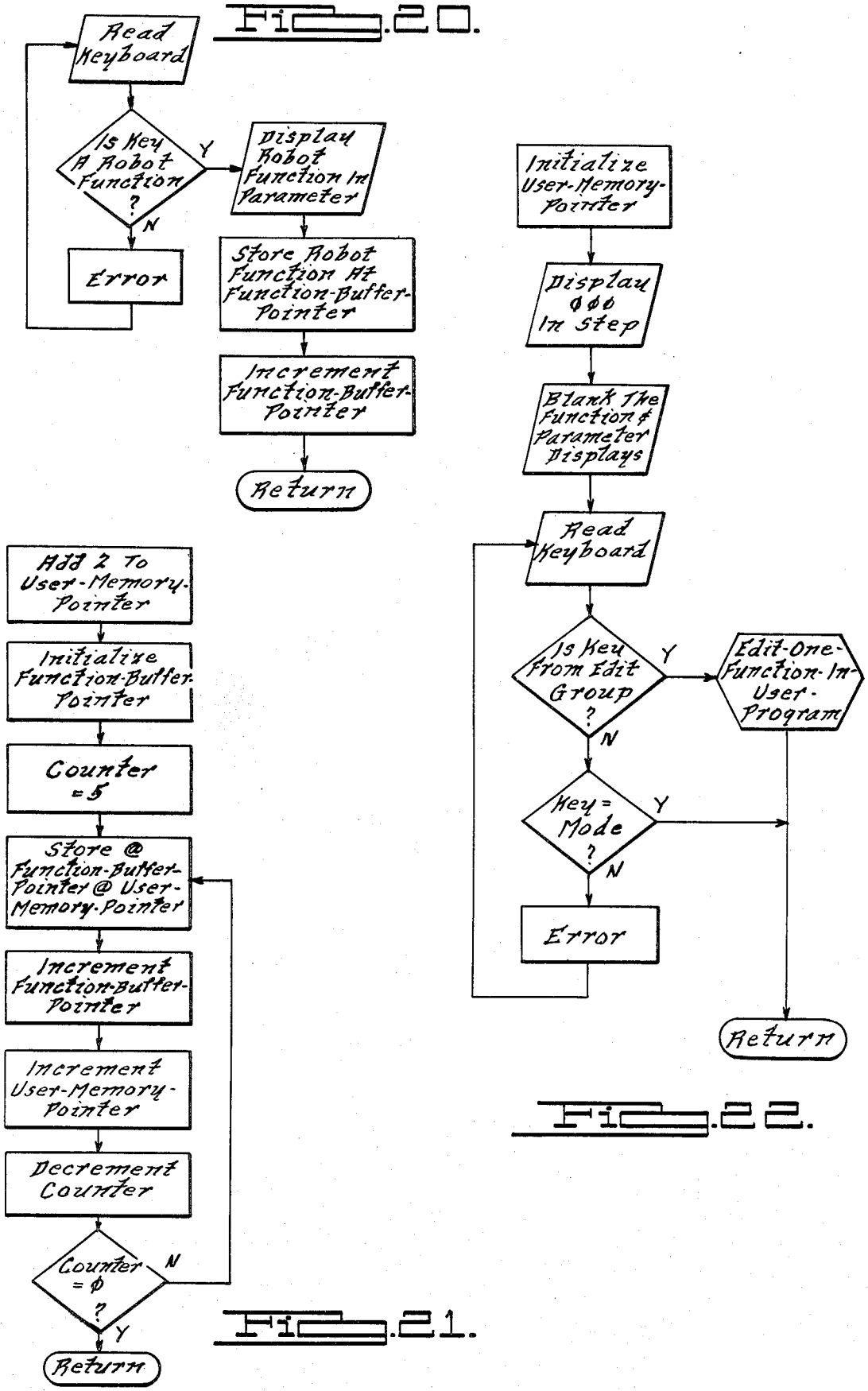

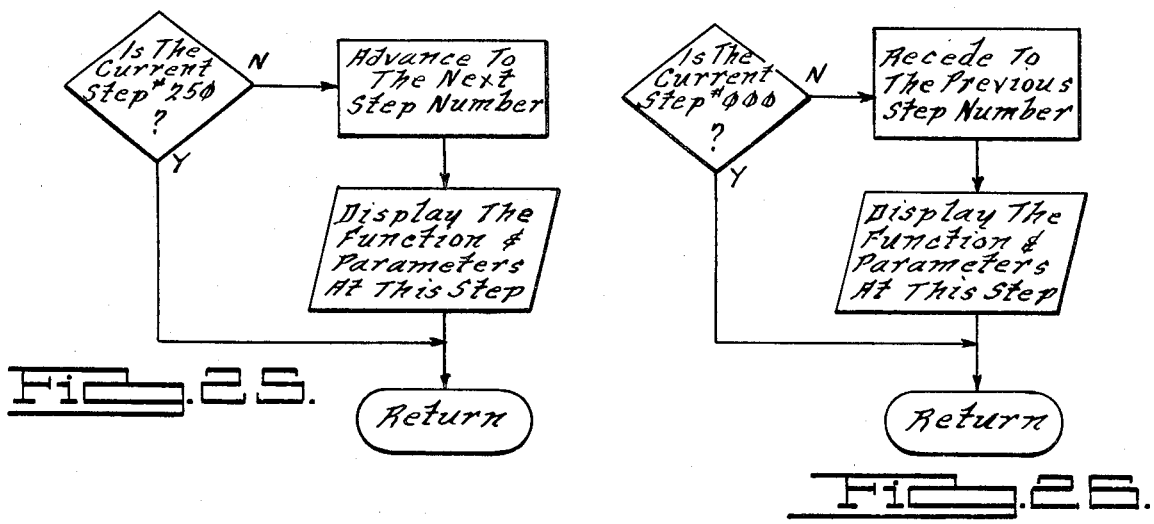
FIG. 25.
FIG. 26.
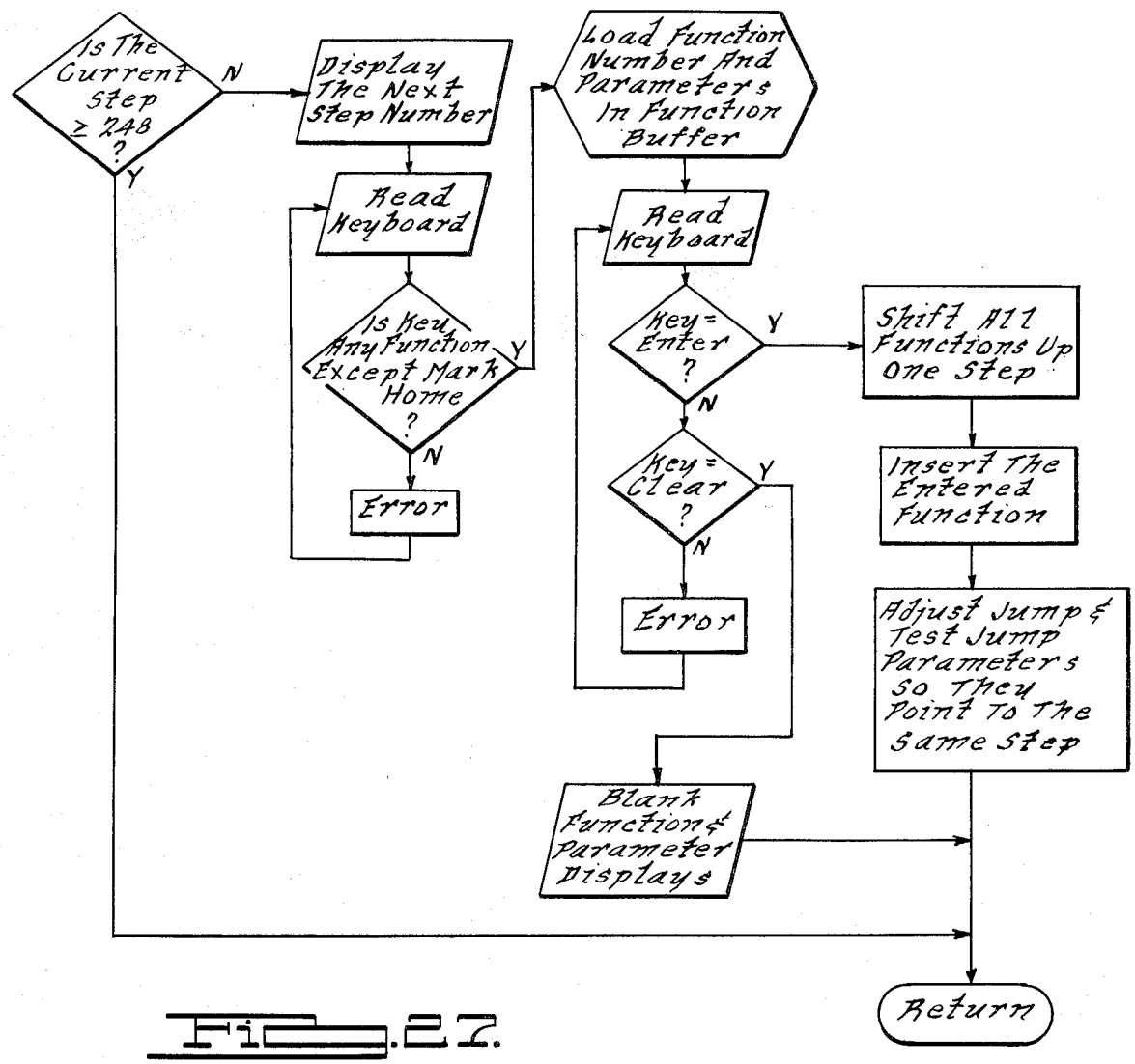
FIG. 27.

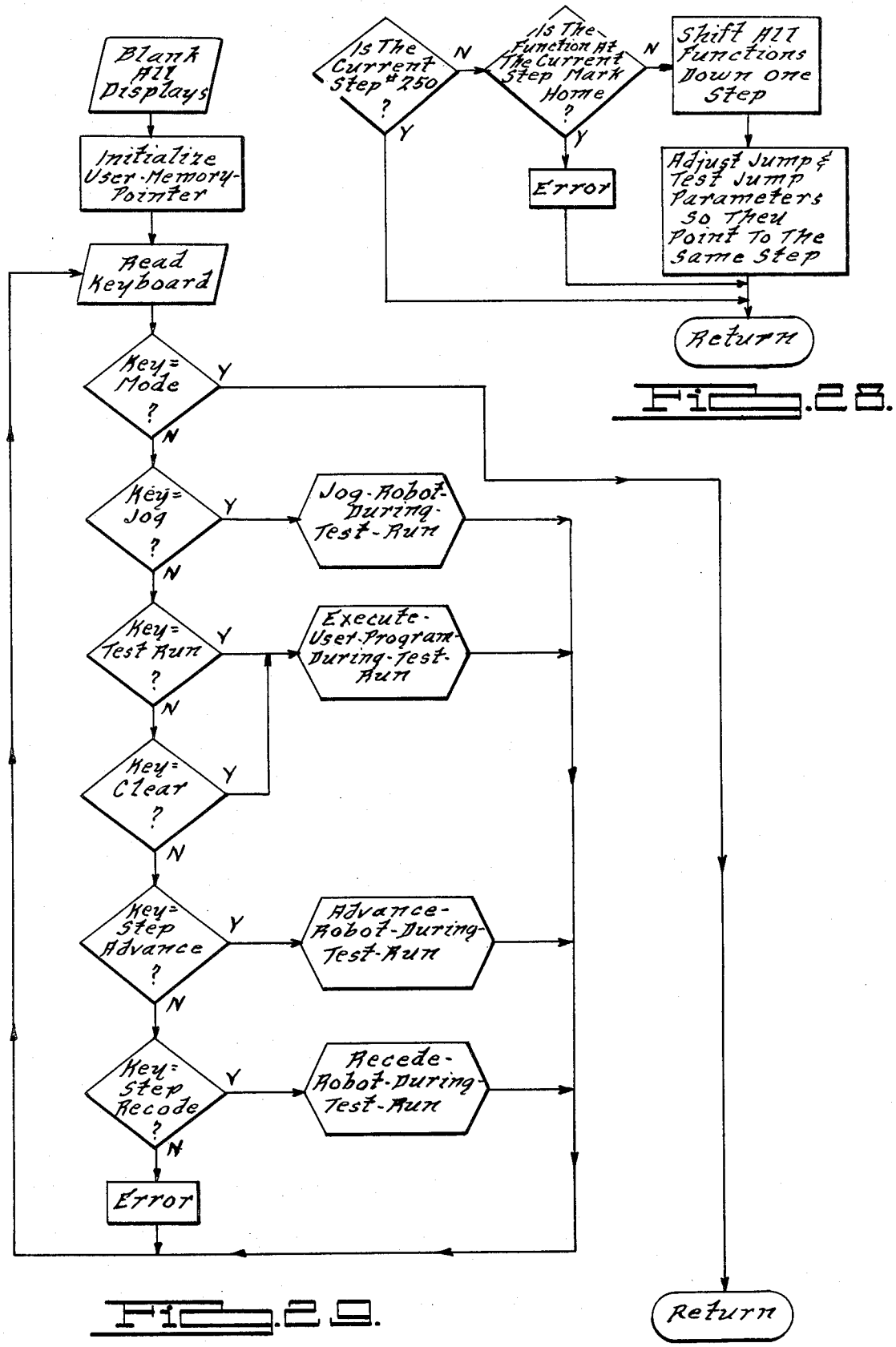

ELECTRONIC CONTROLLER AND PORTABLE PROGRAMMER SYSTEM FOR A PNEUMATICALLY-POWERED POINT-TO-POINT ROBOT

BACKGROUND AND SUMMARY OF THE INVENTION

The present invention relates to a controller and portable programmer therefor for a pneumatically-powered point-to-point industrial robot.

Point-to-point robots are generally the most inexpensive type of industrial robot, typically comprising a body having attached thereto a transfer arm which in turn has mounted at one end thereof a pick-up hand and wrist mount. The body provides vertical lift and rotation motion to the transfer arm and the transfer arm itself is extendable and retractable relative to the body. The wrist mount provides rotary movement to the hand relative to the transfer arm. The hand which may comprise a vacuum cup, pressure grip, or the like, is actuatable for part handling. The extent of each of the various robot movements is defined by mechanical stops which set the limits of travel for each motion. Point-to-point robots do not have the capability of stopping a motion at midstroke. Accordingly, when a particular motion is desired, air pressure is applied to the appropriate cylinder and the particular robot motion commences until the mechanical stop is contacted. By maintaining pressure in the cylinder, the robot remains in the position against the mechanical stop.

In view of the relatively inexpensive nature of pneumatically-powered point-to-point robots, the control systems therefor have been rather rudimentary. For example, air logic control systems are frequently used which are programmed by interconnecting small pieces of plastic tubing on air terminals within the controller. Control is limited to sequencing through a specified series of steps. In addition, some general purpose electronic sequence controllers have been utilized which are less than convenient to program and difficult to reprogram. Moreover, because these electronic sequence controllers are general in nature, their ability to fully optimize the operating efficiency of a robot is significantly compromised.

Accordingly, it is the primary object of the present invention to provide an improved electronic controller for a pneumatically-powered point-to-point robot.

In addition, it is an object of the present invention to provide an electronic controller having a programmable, non-volatile, solid-state memory which eliminates the requirement of creating and maintaining hard copies of the user program for use in re-programming the controller after each shut-down.

Furthermore, it is an object of the present invention to provide an improved portable programmer or "teach control" unit for programming the controller, which is compact and convenient to use, and yet provides the user with a complete array of programming, edit, and test functions.

Additionally, it is an object of the present invention to provide a serial communication link between the controller and the portable programmer which eliminates the requirement of a bulky cable and thus enhances the transportability and convenience of the teach control unit.

The controller of the present invention includes a microprocessor for providing a central processing unit, a read-only memory for storing the main control program, and an output interface for transmitting control signals to the solenoid valves controlling the supply of air to the cylinders used for actuating the robot functions. The controller also features the use of a non-volatile solid-state memory for storing a programmed sequence of encoded robot functions. This memory is non-volatile in the sense that it retains the program when power is removed from the controller, without the requirement of backup batteries. However, the entire program or selected portions thereof (even a single step) may be erased and rewritten without resort to an ultra-violet light source. The controller also includes an input interface for receiving feedback signals from pressure transducers connected to the exhaust side of the cylinders so that positive confirmation of the completion of an operation is received before the controller proceeds to the next program step. The use of positive feedback signals also permits the timing sequence of the robot functions to be optimized, thereby maximizing operating efficiency.

In addition, the teach control unit of the present invention provides the user with a complete array of programming capabilities. The teach control unit contains a display and a keyboard with dedicated keys for robot functions such as GRIP, EXTEND, UP and ROTATE IN, as well as non-robot functions such as OUTPUT for checking a selected output, DELAY for inserting a time delay, and MULTI-ACTION for combining two or more robot functions simultaneously for improving operating efficiency. Also included are various programming and edit keys as well as ten parameter keys. Moreover, the teach control unit includes an interface which provides a serial communication link with the controller which significantly reduces the number of conductors needed to connect the unit to the controller.

Additional objects and advantages of the present invention will become apparent from a reading of the detailed description of the preferred embodiment which makes reference to the following set of drawings in which:

BRIEF DESCRIPTION OF THE DRAWINGS

FIG. 1 is an overall view of a pneumatically-powered point-to-point robot illustrating its general relationship to an electronic controller and portable programmer system according to the present invention;

FIGS. 2a and 2b comprise a block diagram of the controller;

FIG. 3 is a block diagram of the teach control programmer;

FIGS. 4a and 4b comprise a schematic representation of the teach control programmer circuits;

FIG. 7 is an operational flow diagram of the teach control programmer in the programming mode;

FIG. 8 is an operational flow diagram of the teach control programmer in the edit mode;

FIG. 9 is an operational flow diagram of the teach control programmer in the test-run mode;

FIG. 10 is an overall flow chart of the main control program;

FIG. 12 is a flow chart of the process the entry of any function key routine referred to in FIG. 11.

FIG. 13 is a flow chart of the enter user program after mark home routine referred to in FIG. 11.

FIG. 14 is a flow chart of load function number and parameters in function buffer routine referred to in FIG. 12.

FIG. 15 is a flow chart of the load function parameters in function buffer routine referred to in FIG. 14.

FIG. 16 is a flow chart of the enter test jump parameters routine referred to in FIG. 15.

FIG. 18 is a flow chart of the enter output parameters routine referred to in FIG. 15.

FIG. 19 is a flow chart of the enter delay parameters routine referred to in FIG. 15.

FIG. 20 is a flow chart of the enter multi-action parameter routine referred to in FIG. 15.

FIG. 21 is a flow chart of the store function buffer in user memory routine referred to in FIGS. 16-20.

FIG. 22 is a flow chart of the edit user program routine referred to in FIG. 10.

FIG. 25 is a flow chart of the advance key routines referred to in FIG. 23.

FIG. 26 is a flow chart of the recede key routine referred to in FIG. 23.

FIG. 27 is a flow chart of the enter next key routine referred to in FIG. 23.

FIG. 28 is a flow chart of the delete key routine referred to in FIG. 23.

FIG. 29 is a flow chart of the test-run user program routine referred to in FIG. 10.

DETAILED DESCRIPTION OF THE PREFERRED EMBODIMENT

Figure 2A:
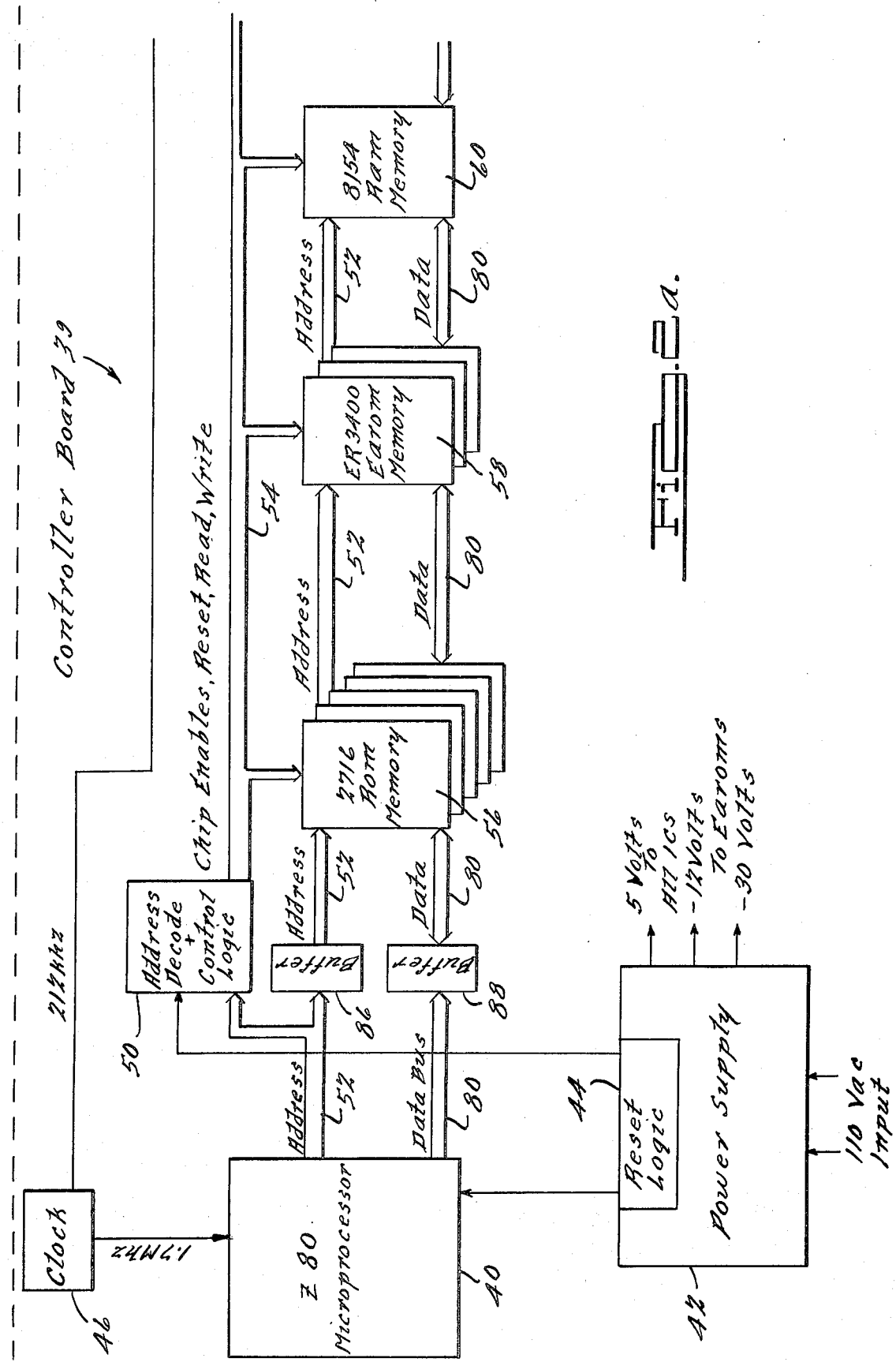

Referring to FIG. 1, an overall view of a pneumatically-powered point-to-point robot 10 and its general relationship to an electronic controller 12 and portable programmer 14 according to the present invention is shown. The robot 10 is generally comprised of a body or article transfer device 16, a transfer arm 18 mounted on a shaft 19, and a rotatable hand 20 mounted on an extendable arm portion 22. The article transfer device 16 provides verticle lift and horizontal rotation of the transfer arm 18. The robot 10 is capable of five sets of movements or robot functions, namely:

(1) grip or release of the jaws 24;
(2) rotate the hand 20 clockwise or counterclockwise;
(3) extend or retract the transfer arm 18;
(4) lift (up) or drop (down) the transfer arm 18; and
(5) horizontally rotate in or out the transfer arm.

Each set of robot functions is actuated by a pneumatic cylinder. For example, cylinder 26 is used for the horizontal rotation movement of the transfer arm 18. The supply of air to these cylinders is provided through tubes, such as tube 27, and controlled by solenoid valves 28. These valves are reversing valves, and operate under the direction of the control signals from the electronic controller 12. Thus, each of the five cylinders of the robot is connected to a solenoid valve, which permits the cylinder to operate as a double-acting cylinder. For example, upon receiving the appropriate control signals, the solenoid valve for cylinder 26 will energize to permit the transfer arm to horizontally rotate out, and reverse to permit the transfer arm to rotate in.

Point-to-point robots, such as robot 10 do not have the capability of stopping a movement at midstroke. When air pressure is supplied to the appropriate cylinder, the robot motion commences and continues until a mechanical stop is contacted, such as stops 30 and 32. These stops are adjustable so that the movements of the robot can be set to the appropriate limits required for a particular application. By maintaining pressure in the cylinder, the robot remains in the position against the mechanical stop. In order for the controller 12 to sense that the various robot functions have been completed, a pressure transducer is provided at the exhaust side of each of the pneumatic cylinders. During a movement, air flows out of the exhaust side of the cylinder and the transducer senses an increased or high pressure. Then, when the mechanical stop is contacted, the flow of air from the cylinder decreases and the pressure drops. Thus, by sensing this change in pressure, the controller determines that the particular robot function has been completed.

In general, point-to-point robots of this kind are employed in industry to remove parts from an indexing conveyor or the like, transfer them to another station in the manufacturing process, and release them. This sequence of steps or work cycle is, of course, intended to be repeated many times, and is therefore ordinarily fixed. However, as manufacturing processes are subject to change, and in order to provide added versatility, the robot control system according to the present invention provides a ready means for modifying the user program or sequence of steps.

The robot control system is comprised of two basic components, namely the electronic controller 12 and a portable teach control programmer 14. The teach control unit 14 is connected to the controller 12 through a serial communication link via cable 34 and connectors 36 and 37. Thus, one teach control unit 12 may be employed to program several controllers. The controller is provided with a selector switch (not shown) to select one of two states of operation, namely auto-run, and program-edit/test-run. When the operator selects the program-edit/test-run state, the teach control unit is enabled for operation with the associated controller 12. As will be more fully described with reference to FIGS. 3, 4 and 5, the teach control 14 includes a keyboard 38 which is employed to generate a user program for storage in the controller. When the operator selectes the auto-run state via the selector switch, the teach control unit 14 is disabled or inoperative, and the controller 12 is ready to execute the stored user program. However, a start button on the front panel of the controller 12 must be pressed before execution of the program will begin.

Turning now to FIGS. 2a and 2b, a block diagram of the electronic controller 12 is shown. The heart of the controller in the preferred embodiment is a Zilog Z80 microprocessor 40, although other suitable microprocessors can be used. The controller board 39 contains a power supply 42 which converts 110 volts a.c. input to the appropriate d.c. levels necessary to power the integrated circuits on the board. A reset logic circuit 44 is also provided to automatically reset the microprocessor 40 when power is initially turned on. The microprocessor 40 is clocked by a 1.7 Mhz clock signal from a crystal clock circuit 46 which also produces a 212 Khz clock signal connected to the clock input terminal of the parallel-to-serial converter 48 providing the input/output interface between the controller 12 and the portable programmer or teach control unit 14.

The microprocessor 40 accesses the various integrated circuits on the controller board 39 via an address decode and control logic circuit 50 which is tied to the address bus 52 of the microprocessor 40 and is adapted to provide the appropriate chip enable, reset and read/write signals to the circuits accessed by the microprocessor 40 on lines 54. The main control program for the microprocessor 40 is stored in a ROM memory 56 that is inaccessible to the teach control 14. The flowchart outline of the main control program is illustrated in FIGS. 10-35 and controls the manner in which robot functions are encoded, decoded, stored, fetched and executed. The memory accessible by the teach control 14, referred to as "user memory" 58, comprises 3K bytes of non-volatile EAROM. An EAROM is used for this purpose because it provides the read/write capabilities of a RAM with the non-volatility of a ROM. Thus, the user can readily enter end edit functions and parameters stored in the user memory 58 and the resulting program will remain in the EAROM 58 after power to the controller board is removed. Accordingly, the necessity of having to generate a "hard copy" of the user generated program to re-program the controller each time the system is used, as is conventional with other controllers, is avoided.

The controller 12 is also provided with a random-access memory 60, which serves as an optional input/output interface. This memory provides an additional sixteen input/output lines which may be employed to link the controller to various peripheral devices, such as a printer. The controller 12 is provided with two other parallel input/output interfaces, namely interface 62 and interface 64. In the preferred embodiment, each of these interfaces provides twenty four input/output lines. Interface 62 serves as the primary input/output interface of the controller 12 to the robot 10. Interconnected between the robot and interface 62 is primary input/output circuit board 63, via ribbon cable 65. Input/out board 63 includes twelve triac driver circuits 66, which are used as 110 volt a.c. switches to the five solenoid valves 28 of the robot. Since the solenoid valves are reversing valves, two control signals are required for each valve. Thus, two of the available triac driver circuits 66 are not required, and may be used in reserve. The board 63 also includes twelve optically-isolated coupler circuits 68, which are used to receive the pressure signals from the transducers at the exhaust side of the pneumatic cylinders. As in the case of the triac driver circuits 66, two of the coupler circuits 68 are not required, and may be used in reserve. Alternatively, one of the coupler circuits 68 could be employed to warn the controller of a decrease in the air pressure supply to the robot. Both the triac driver and coupler circuits are conventional in design. In the preferred embodiment, the triac driver circuit includes a Motorola MOC 3030 integrated circuit and the optical coupler circuit includes Hewlitt-Packard HCPL 3700 integrated circuit.

Interface 64 provides the secondary input/output interface of the controller 12. Input/output board 70, triac driver circuits 72, and optically-isolated coupler circuits 74 are similar in number and configuration to those just described for the primary interface. The output lines may be employed for indicator lamps and the input lines employed for panel switches. Additionally, these input/output lines may be used to receive various inputs and generate signals as needed for a particular robot application. For example, one input line could be employed to inform the controller that the part to be transferred has arrived at the transfer station on the conveyor. Similarly, another input line could be employed to inform the robot that another station in the manufacturing process is ready to receive the object to be transferred.

The final interface of the controller 12 is provided by buffer 76 and latch 78. As with each of the other interfaces and solid-state memory devices described above, this interface is connected to the eight data lines 80 of the microprocessor 40. Buffer 76 provides an interface to a set of mode switches 82, which may be used for diagnostic purposes. Latch 78 provides an interface to a set of diagnostic display lamps 84, corresponding to switches 82, which are used to give a visual indication of the presence/absence of a signal on the data lines.

The controller is also provided with a buffer 86, which is used as a current driver on the address bus 52. Similarly, buffer 88 provides a bi-directional current driver on the data bus 80. Finally, a buffer 90 is provided in the communication link between the controller 12 and the teach control unit 14. Buffer 90 is interconnected between parallel-to-serial converter 48 and cable 92 and provides power to the teach control unit and double-ended serial communication lines, as will be more fully described with reference to FIG. 4a.

Figure 4A:
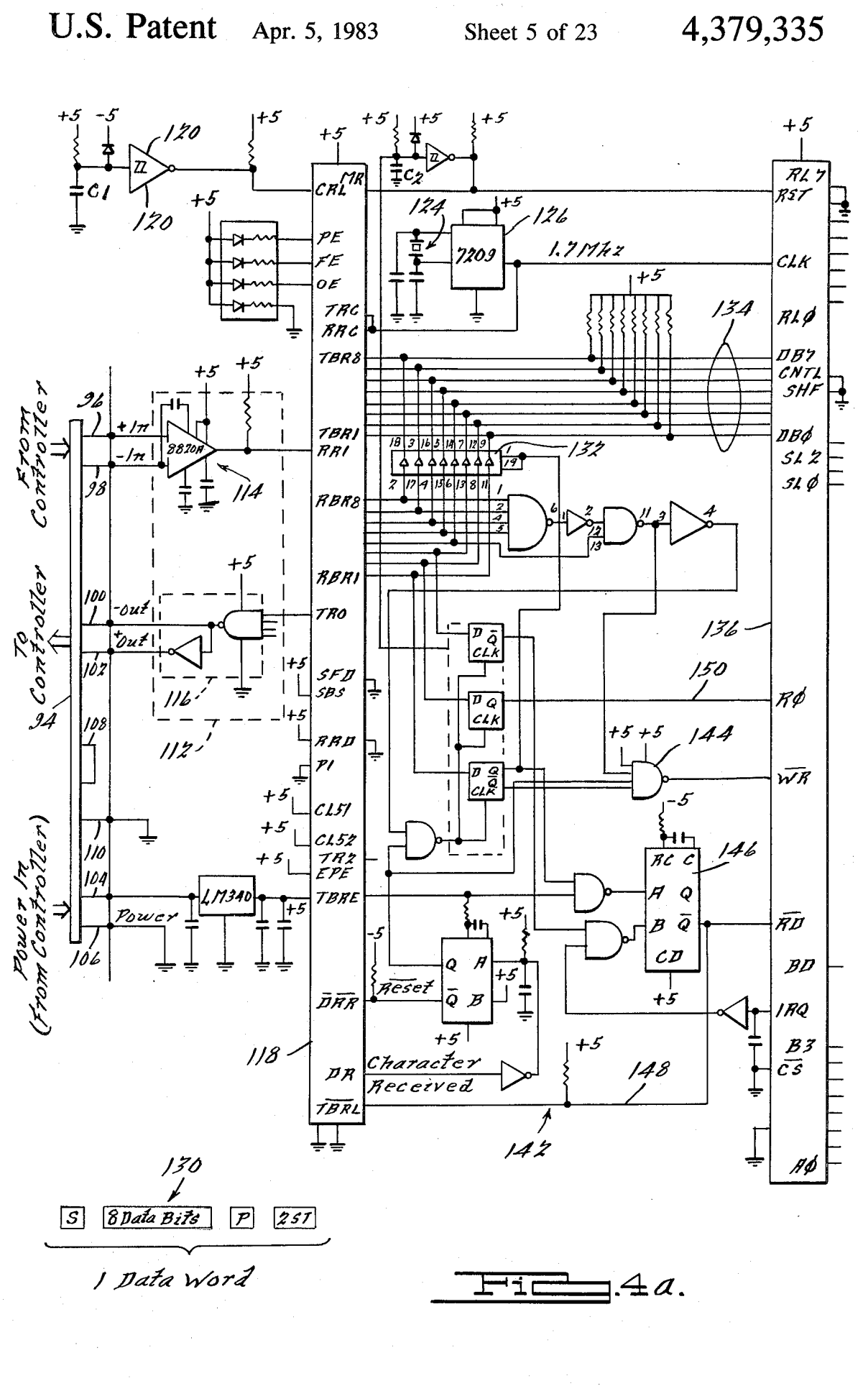
Figure 4B:
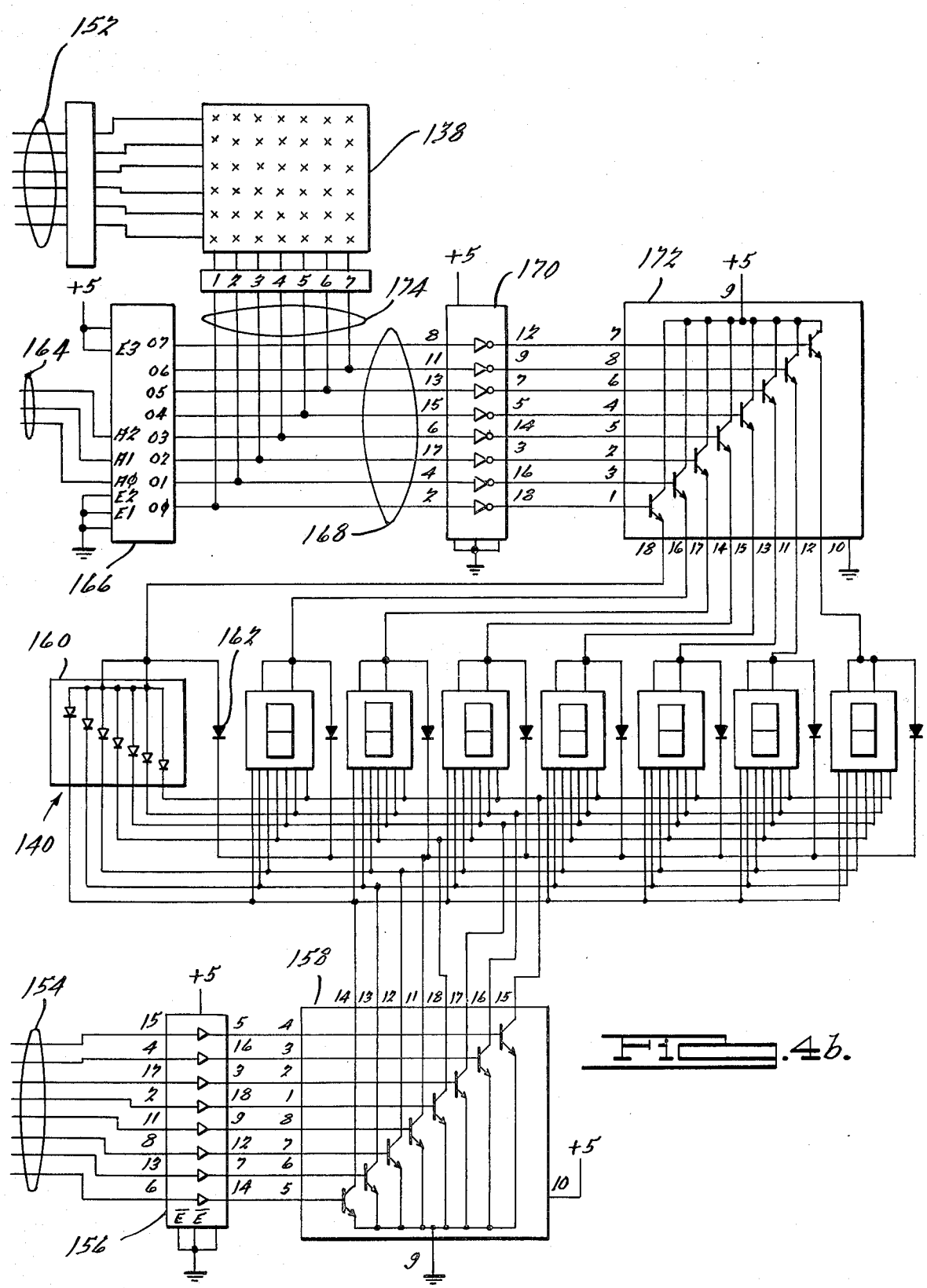

Referring to FIG. 3, a block diagram of the teach control unit 14 is shown. The specific circuitry for the teach control unit is shown in FIGS. 4a and 4b, and will be described in conjunction with FIG. 3. As described above, cable 92 provides a double-ended serial communication link between the controller 12 and the teach control unit 14. A connector 94 at the end of the cable is shown in FIG. 4a. As indicated, two complementary lines 96 and 98 are provided for data transmission to the teach control unit from the controller, two complementary lines 100 and 102 are provided for data transmission from the teach control unit to the controller, and two lines 104 and 106 are provided to transmit electrical power to the teach control unit. Connector 94 is also provided with a cable shield line 110 and a signal line 108, which is used by the controller to recognize that the teach control unit is connected.

A buffer 112, shown in FIG. 3 to be connected to cable 92, is similar to buffer 90 shown in FIG. 26. Buffer 112 is shown in FIG. 4a to comprise a differential line receiver 114 and differential line transmitter 116, which provides a double-ended communication link to improve noise immunity. Buffer 112 is connected to an interface 118 which in the preferred embodiment comprises a universal asynchronous receiver-transmitter (UART) integrated circuit, manufactured by Intersil (IM 6403). The UART 118 acts as a serial-to-parallel converter for transmission from the controller to the teach control unit, and acts as a parallel-to-serial converter for transmission from the teach control unit to the controller. The UART contains eight pins for the transmit buffer (labeled TBR 1-8) and eight pins for the receive buffer (labeled RBR 1-8). The UART also includes two power on reset pins, namely control load (CRL) and master reset (MR). The reset signals are provided respectively through inverters 120 and 122. The capacitors $C_1$, coupled to inverter 120, and $C_2$, coupled to inverter 122, have values to provide the appropriate time constants required by the UART. The UART is clocked by a 1.7 Mhz clock signal, which is generated by a clock circuit 128, comprised of a 13.5 Mhz crystal 124 and a frequency divider 126.

Communication between the controller and teach control unit is provided in a twelve bit data word format 130, as illustrated in FIG. 4a. The first bit, labeled "S", is the start bit, which is always "LO". The next eight bits provide the data word transmitted. The bit labeled "P" is a parity bit. This bit will be "HI" if there is an even number of "HI" or "1" bits in the data word, and "LO" for an odd number. The last two bits, labeled "2ST", are stop bits, and are always "HI". Thus, the UART looks for a "LO" bit following two "HI" bits in order to determine that a data word is being transmitted.

A buffer or current driver 132 is interconnected between the TBR (1-8) lines and the RBR (1-8) lines of the UART 118. Thus, the TBR (1-8) lines form a bi-directional data bus 134. Data bus 134 is connected to a keyboard decoder and display driver 136 (at pins BD 0-7), which in the preferred embodiment comprises a single integrated circuit manufactured by National Semiconductor (8279). The particular decoded/driver circuit 136 utilized herein is adapted for use with a microprocessor and therefore requires various command signals of the type generated by a microprocessor. However, because the decoder/driver circuit 136 is not being operated by a microprocessor in the present application, these command signals must be generated by alternative means. This function is performed in the present system by the control logic circuitry 142, which is interconnected between the UART and the decoder/driver circuit 136. For example, the control logic circuit 142 provides a WRITE signal through NAND gate 144 to a pin labeled $\overline{WR}$, which commands the decoder/driver 136 to write information on the display. The control logic circuit 142 further provides a READ signal through a one-shot integrated circuit 146 to a pin labeled $\overline{RD}$, which commands the decoder/driver 136 to interrupt its operations and read the keyboard when one of the keys is depressed. The signal from the one shot 146 is also directed to the UART 118 on line 148 to inform the UART that data to be transmitted to the controller is forthcoming. The control logic circuit 142 also provides for a signal on line 150 to inform the decoder/driver 136 whether a command word or data word is present on bi-directional bus 134.

Referring to FIG. 4b, the keyboard 138 provides data to the decoder/driver 136 (at pins labeled RL 0-7) via a first keyboard bus 152. The decoder/driver provides eight output lines (at pins labeled A 0-3 and B 0-3) to the display 140 to form a display bus 154. Connected to the display bus 154 is a buffer 156, which provides a current driver to a light emitting diode (LED) segment driver integrated circuit (ULN 2803A) 158. As illustrated in FIG. 4b, the display 140 is comprised of eight seven-segment LED digits 160, and seven LED lamps 162 which are driven off the scanning bus 164 of the decoder/driver (at pins labeled SL 0-2). Bus 164 is coupled to a demultiplexer integrated circuit (74 LS 138) 166, which provides a set of eight scan lines 168, one for each LED digit 160. The scanning lines 168 are connected to a buffer 170, which provides a current driver to an LED digit driver integrated circuit (UDN 2981A) 172. Seven of the eight scanning lines are also connected to the keyboard 138 via a second keyboard bus 174. Thus, the decoder/driver 136 scans both the rows of the keyboard 138 and the digits of the display 140.

Figure 5:
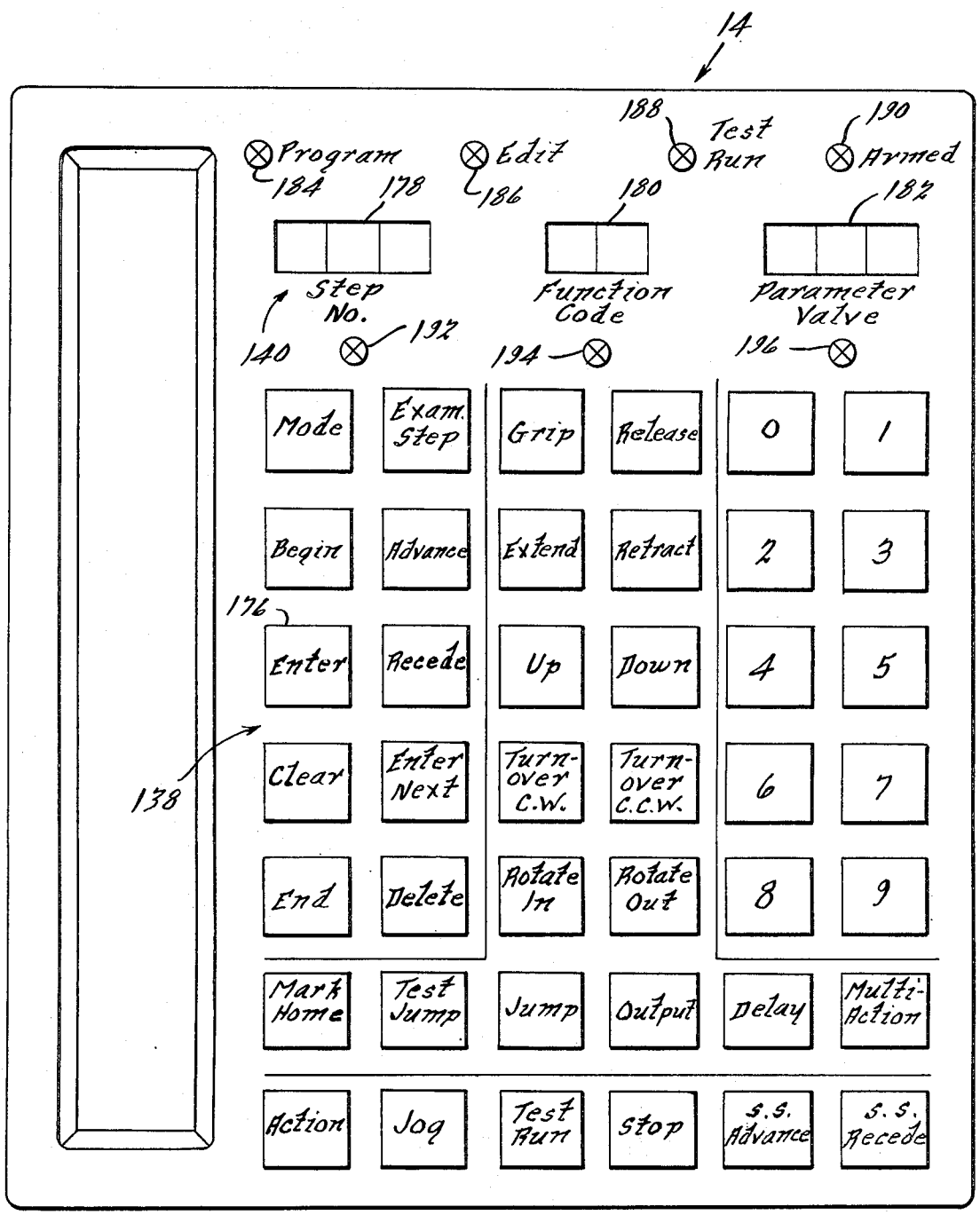
FIG. 5 is a front elevation view of the teach control programmer, particularly illustrating the various keys and displays.

Referring now to FIG. 5, a front elevation view of the teach control unit 14 is illustrated. The keyboard 138 is shown to comprise a six by seven matrix of forty two keys 176. This matrix is divided into five groups of keys, namely Program, Edit, Functions, Parameters, and Motion/Execution. The Program group consists of the MODE, BEGIN, ENTER, CLEAR, and END keys. The MODE key is used to toggle between the three modes of operation of the teach control unit 14, namely program, edit, and test-run. The BEGIN key is used to inform the controller 12 that the user is about to enter a new program into the user memory (EAROM 58). The ENTER key is used to store the function selected into the user memory and to advance the program to the next step. The CLEAR key is used to blank the display 140 and commands the controller to disregard the last function keyed in. If the CLEAR key is depressed when the teach control unit is in the test-run mode, then execution of the user program will begin at the first step location in the program. The END key is used to indicate the end of the user program.

The Edit group consists of the EXAMINE STEP, ADVANCE, RECEDE, ENTER NEXT, and DELETE keys. The EXAMINE STEP key is used in conjunction with the Parameter group of keys, which consists of the keys labeled 0 through 9. When the EXAMINE STEP key is followed by a three digit step number selected from the parameter keys, the particular function and parameter at the selected step will be indicated on display 140. The step number in the user program will be displayed on the three LED digits indicated at 178. A two digit code representing the function at the selected step will be displayed on the two LED digits indicated at 180. Similarly, three LED digits 182 are used to display the parameter value stored at this step number. The ADVANCE key is used to increment to the next step in the user program, so that the function code and parameter value may be examined on the display. Likewise, the RECEDE key is used to decrement to the previous step. The ENTER NEXT key is used to insert a function and parameter value at the next step in the user program. The DELETE key is used to delete the function and parameter value at the current step in the user program.

The Function group of keys is divided into two sub-groups, namely robot functions, and non-robot functions. The robot function sub-group consists of the five sets of available robot movements described with reference to FIG. 1. Accordingly, the robot function sub-group includes the GRIP and RELEASE, EXTEND and RETRACT, UP and DOWN, TURN OVER C.W.

(clockwise) and TURN OVER C.C.W. (counter-clockwise), and ROTATE IN and ROTATE OUT keys.

The non-robot function sub-group consists of the MARK HOME, TEST JUMP, JUMP, OUTPUT, DELAY, and MULTI-ACTION keys. The MARK HOME key does not represent an executable function, but rather is used as a marker to designate the initial step in the portion of the user program representing the work cycle to be repeated. The main control program stored in the controller (ROM 56) provides for a jump to the step in the user program selected as MARK HOME when the last step in the user program is executed. Thus, the steps in the user program preceding MARK HOME generally provide for a sequence to locate the robot arm into the initial position of the transfer process which is intended to be repeated. The TEST JUMP key is used in conjunction with one of the input lines for the primary 62 or secondary 64 interfaces described with reference to FIG. 2b. If a 110 volt a.c. external signal is being applied to the input line selected, then the program jumps to the desired step; otherwise, the program continues to the next step. The JUMP key is used to provide an unconditional jump to a three digit step number selected from the parameter keys. The OUTPUT key is used to apply or remove a 110 volt a.c. signal to or from a selected output line. The DELAY key is used to delay the execution of the next function a specified amount of time in tenths of seconds. The period of the delay is selected by depressing the appropriate parameter keys after depressing the DELAY key. This is an important feature of the teach control unit, because it permits the cycling time in the sequence of robot movements to be optimized. The MULTIACTION key allows for two robot functions to be executed simultaneously without waiting for the first robot function to be completed. As with the DELAY key, the MULTIACTION key allows the user to optimize, where possible, the required time to perform the desired work cycle operation.

The Parameter group of keys, labeled 0 through 9, are used in conjunction with the EXAMINER STEP, TEST JUMP and JUMP keys to identify the desired step number to be examined or jumped to. The Parameter keys are further employed in conjunction with the OUTPUT key to designate a particular input/output port. The Parameter keys are also used in conjunction with the DELAY key as previously noted to designate the period of delay in tenths of seconds.

The Motion/Execution group consists of the ACTION, JOG, TEST-RUN, STOP, STEP ADVANCE, and STEP RECEDE keys. The ACTION key is operable only at the beginning of a user program entry. When this key is depressed at this time, the robot will move as the robot functions are entered on the keyboard. Thus, the operator in creating a programmed sequence of steps may observe each robot movement selected as the program is developed. The JOG key is operable only during the test-run mode. When this key is depressed during the test-run mode, any robot function key may be depressed and the appropriate robot motion will occur, without affecting the pre-programmed sequence in the user program. The JOG key thus provides a convenient means for setting the positions of the mechanical steps on the robot. The TEST-RUN key is used to begin execution of the user program. As the name implies, this key permits the user to test the program before switching the controller over to the auto-run position. The advantage of the test-run feature is that the user program may be stopped at any time by depressing the STOP key. When the STOP key is depressed, the execution of the user program will stop after the current function has been completed. The STEP ADVANCE key is used to execute a single step forward in the user program. Similarly, the STEP RECEDE key is used to execute a single step backward the user program.

As described above, the teach control unit is capable of three modes, namely program, edit, and test-run. In the program mode, the operator can enter up to 250 steps in the program, beginning with step number 000. More steps can, of course, be added merely by increasing the storage capacity of the EAROM 58. As the functions are pressed, the corresponding numeric value code is shown on the display 180. The function code is a two digit code; the first digit identifies the key group and the second digit identifies the particular key within that group. This is illustrated in the following example:

| 0X | Program group | 02 = CLEAR |
|----|---|---|
| 1X | Edit group | 14 = DELETE |
| 2X | Robot Function sub-group | 22 = UP |
| 3X | Parameter group | 39 = 09 |
| 4X | Non-Robot Function sub-group | 45 = MULTIACTION |
| 5X | Test-Run group | 50 = TEST-RUN |

During program entry the microprocessor 40 is programmed to expect keys from a certain group to be depressed at a specific time. Accordingly, the microprocessor 40 is programmed to initially test the upper nybble (first digit) for validity before the lower nybble (second digit) is decoded. If a wrong key is pressed, an error message is displayed by enabling a dash segment sequentially across the eight LED digit displays. If parameters are required by the function selected, the numbers selected will be displayed on LED digits 182 as they are keyed in. The operator may then press the ENTER key to store the function, or press the CLEAR key to disregard the function. There are two keys which must be pressed before the user may exit the program mode. The MARK HOME position must be entered at some step during the entry of the program and the END key must be pressed to indicate that the user is finished.

The edit mode is used to modify the program entered and stored in the controller user memory. Any step can be examined to see the function and parameter value contained therein. The ADVANCE and RECEDE keys are used to increment and decrement the steps and examine the contents. Any function, except MARK HOME, may be inserted or deleted whenever desired, by the ENTER NEXT and DELETE keys. However, the step numbers of any JUMP and TEST JUMP functions may have to be changed accordingly when functions are added or deleted.

After the user has performed a test execution of the program in the test-run mode and fully debugged the program, the controller may then be switched over to the auto-run mode. This mode provides for a continuous execution of the user program after the start button is pressed. The teach control unit is not used in this mode, and may be disconnected from the controller.

The teach control unit is also provided with LED lamps to indicate which mode the unit is in. Accordingly, a lamp 184 is provided for the program mode, a lamp 186 is provided for the edit mode, and a lamp 188 is provided for the test-run mode. The teach control unit is further provided with four additional indicator lamps. Lamp 190 is activated when a command is being executed instructing robot movement. Lamp 192 is activated when the controller expects the operator to select a specific step number, such as after the JUMP key is depressed. Likewise, lamp 194 is activated when a robot function is expected, and lamp 196 is activated when a parameter value is expected.

Figure 6:
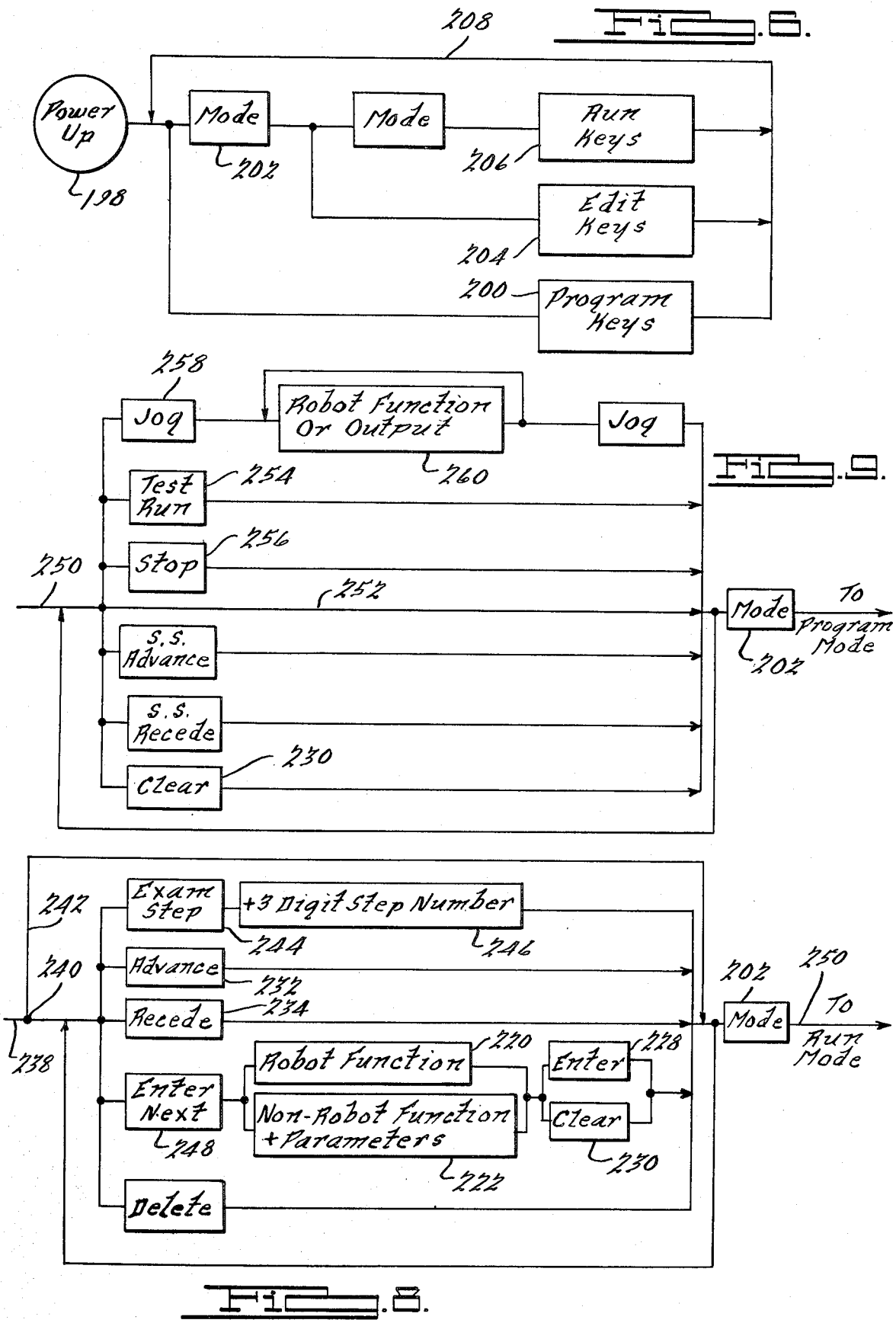
FIG. 6 is an overall operational flow diagram of the teach control programmer.
Figure 11:
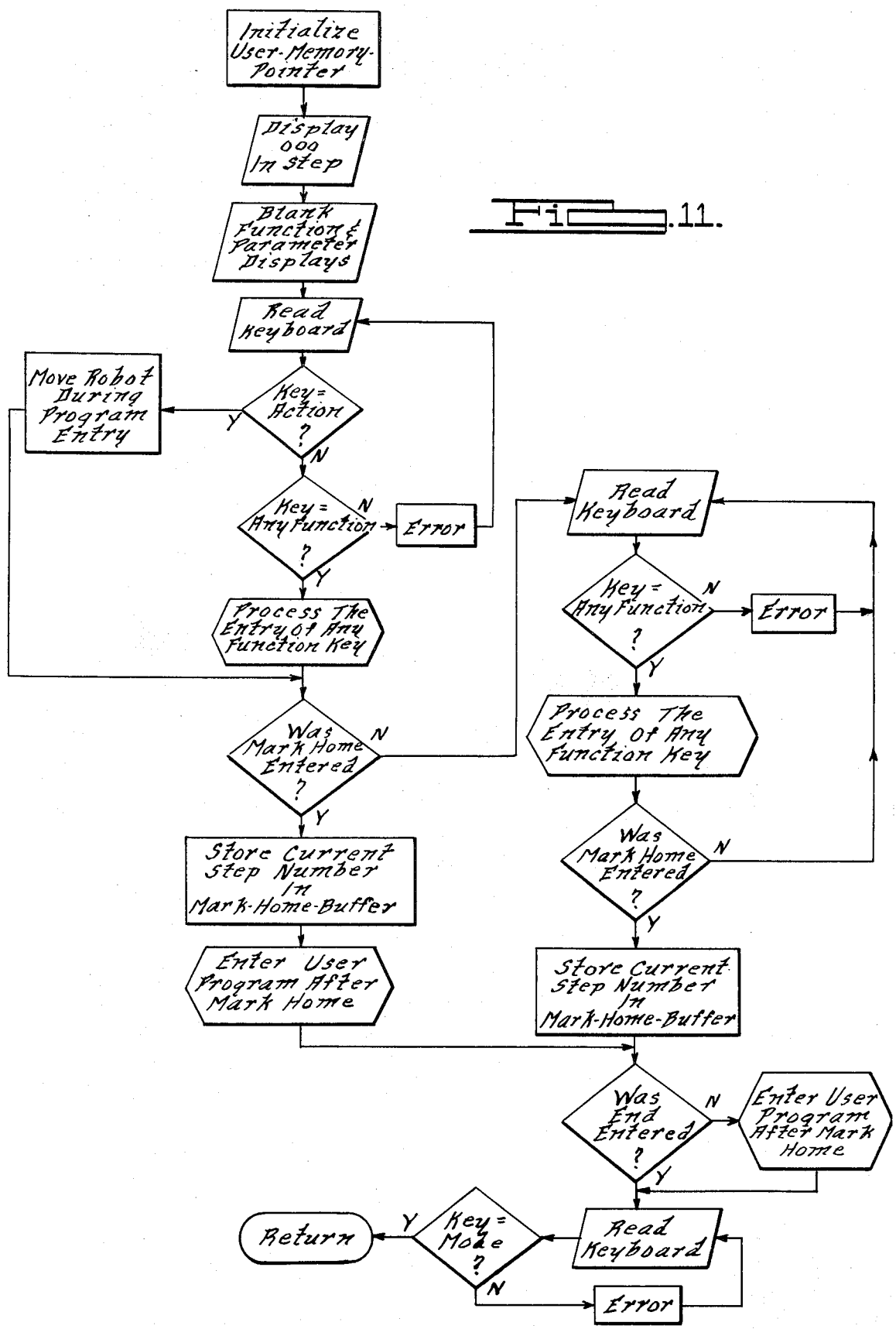
FIG. 11 is a flow chart of the enter user program routine referred to in FIG. 10.
Figure 17:
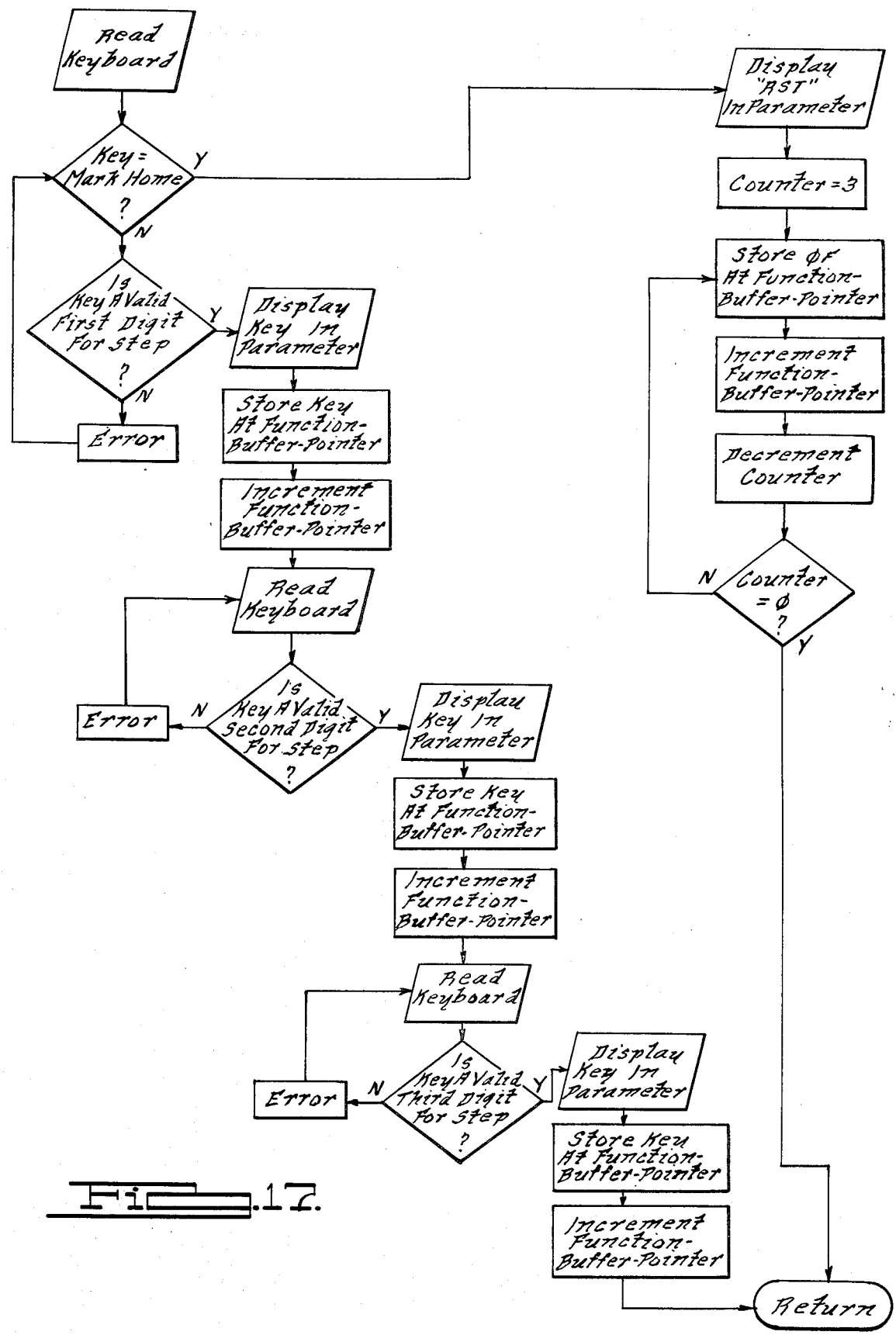
FIG. 17 is a flow chart of the enter jump parameters routine referred to in FIG. 15.
Figure 23:
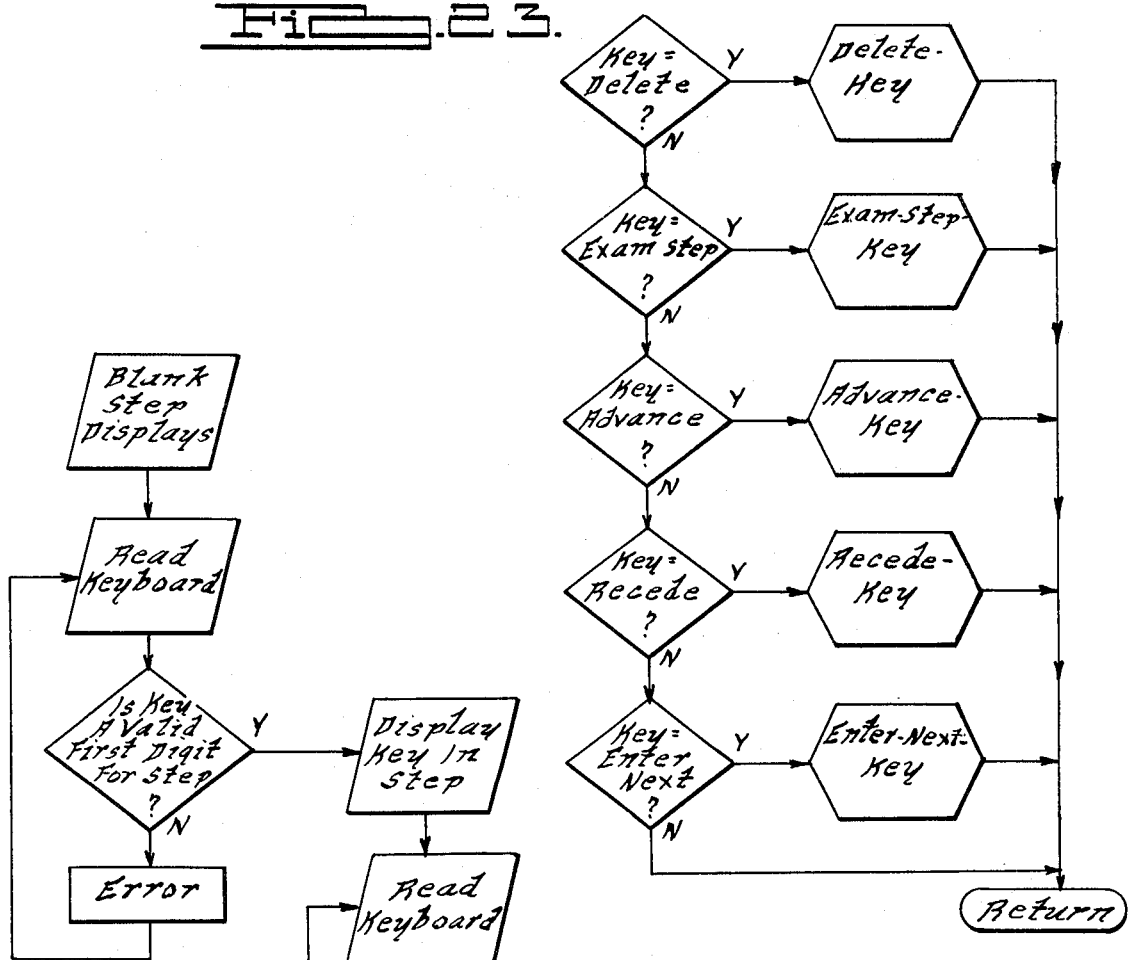
FIG. 23 is a flow chart of the edit on function in user program routine referred to in FIG. 22.
Figure 24:
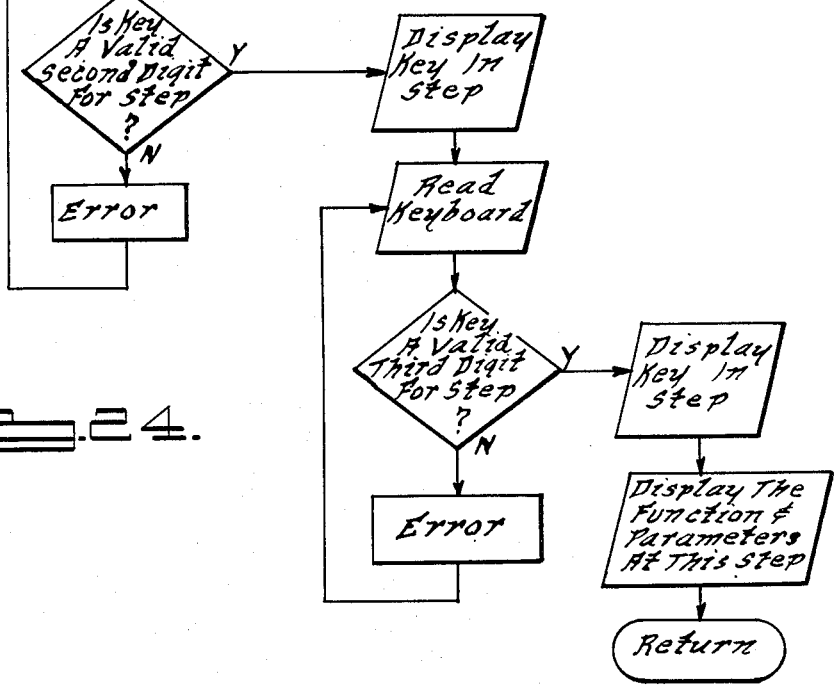
FIG. 24 is a flow chart of the examine step key routine referred to in FIG. 23.
Figure 30:
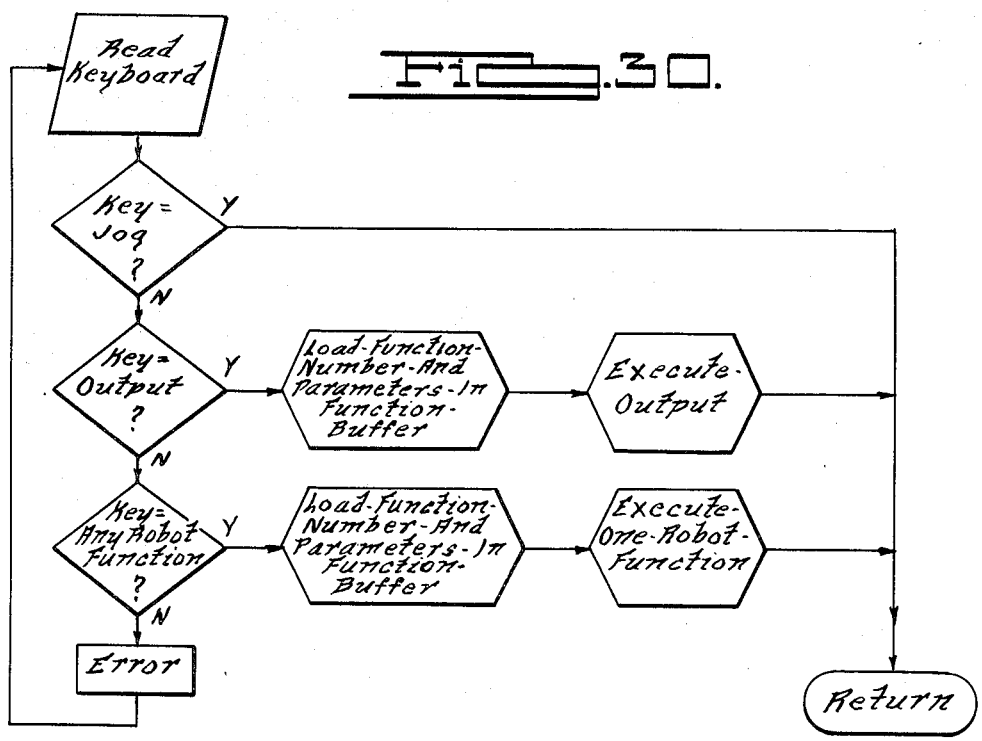
FIG. 30 is a flow chart of the jog robot during test-run mode routine referred to in FIG. 29.
Figure 32:
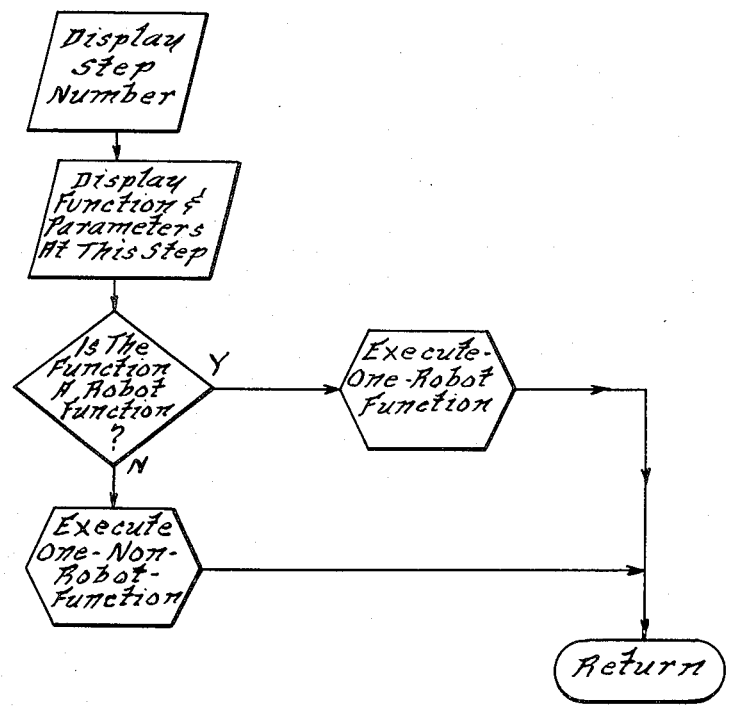
FIG. 32 is a flow chart of the execute one function routine referred to in FIG. 31.
Figure 31:
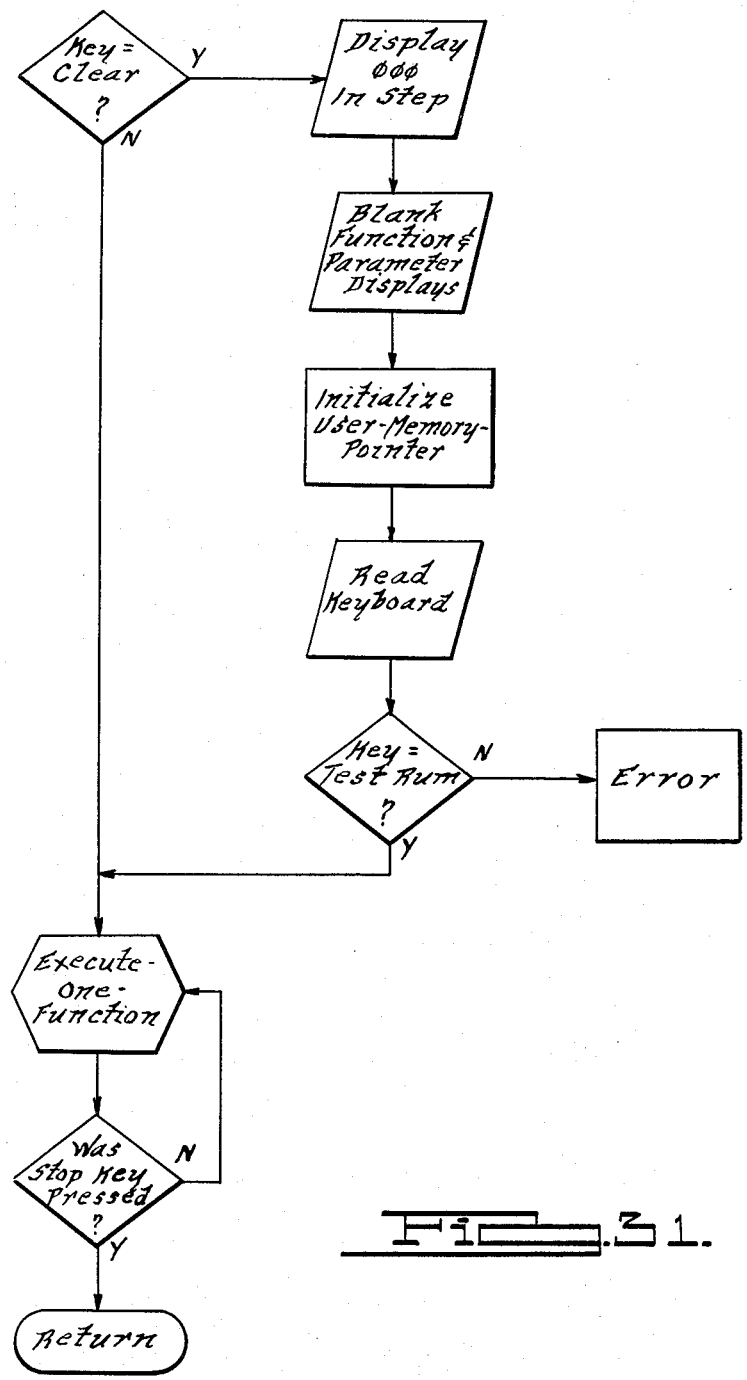
FIG. 31 is a flow chart of the execute user program during test-run mode routine referred to in FIG. 29.
Figure 33:
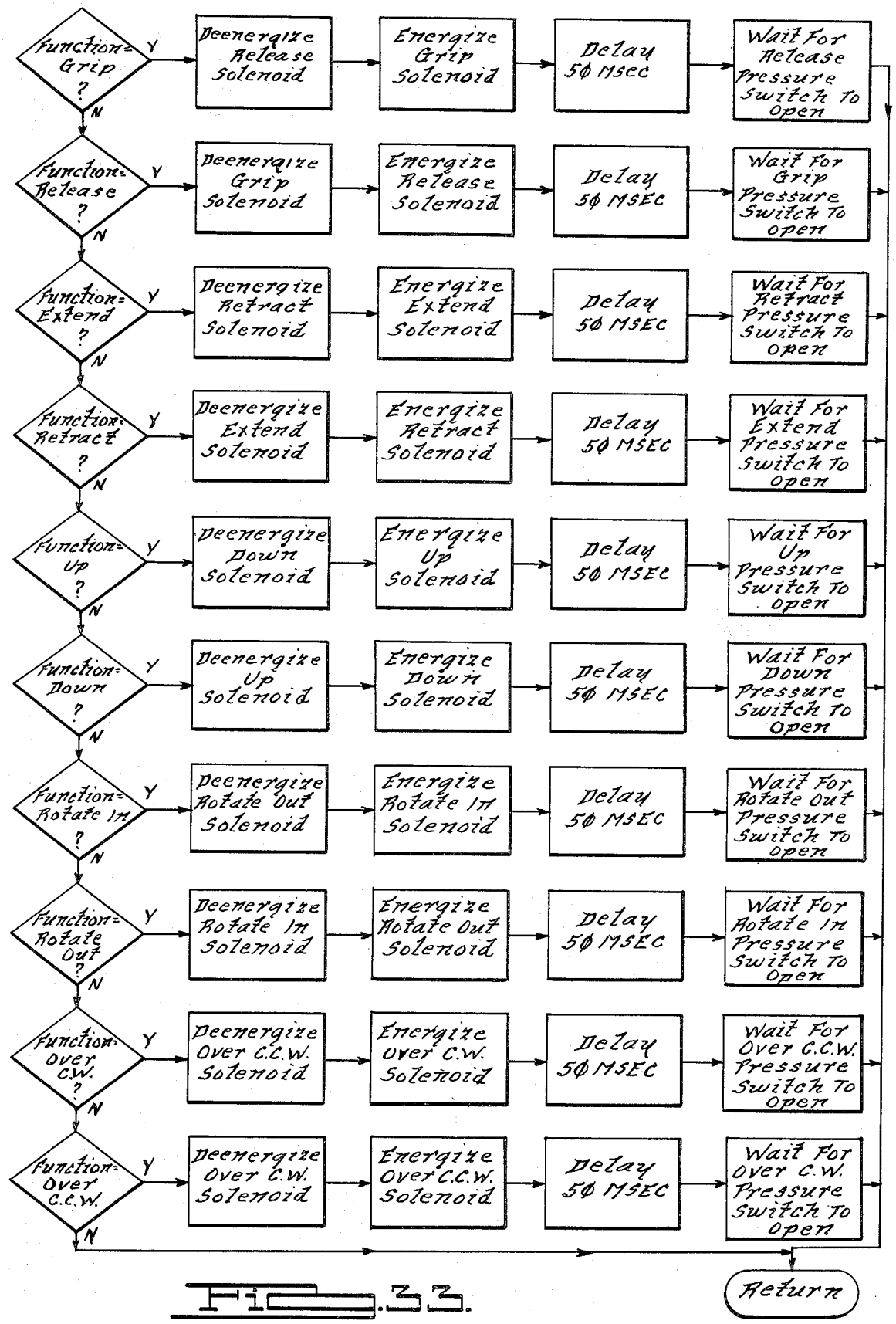
FIG. 33 is a flow chart of the execute one robot function routine referred to in FIGS. 30 and 32.
Figure 34:
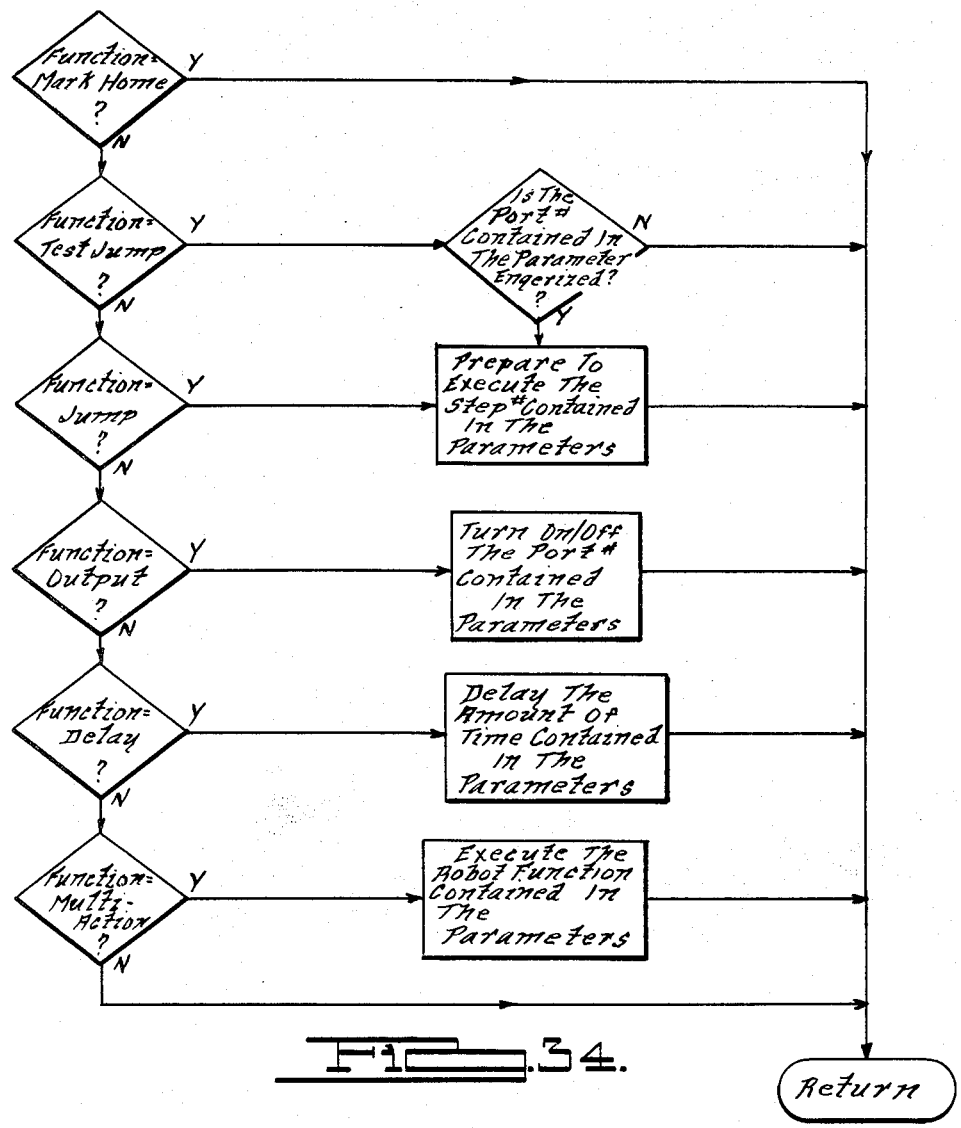
FIG. 34 is a flow chart of the execute one non-robot function routine referred to in FIG. 32.
Figure 35:
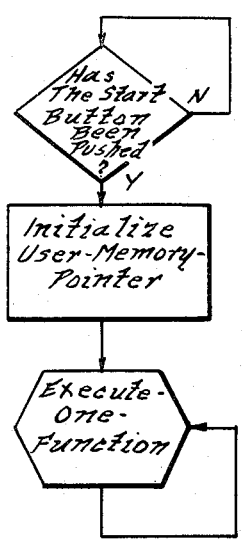
FIG. 35 is a flow chart of the auto-run user program routine referred to in FIG. 10.

Referring now to FIG. 6, an overall operational flow diagram for the teach control unit is shown. After the teach control unit is connected to the controller and receives electrical power at "power up" 198, the unit automatically reverts to the program mode. Thus, the user may begin entering the program on the program keys 200 without first pressing the MODE key 202. Alternatively, the user may depress the MODE key once in order to access the edit group keys 204 or twice to access the test-run group keys 206. Flow line 208 indicates that after selecting the program, edit, or test-run modes, the user may later choose another mode.

Referring to FIG. 7, an operational flow diagram for the programming mode is shown. Junction 210 represents the operational point immediately after "power up." Line 212 indicates that the user may choose to enter the edit mode, rather than continue in the programming mode. If the user decides to create a program, then the BEGIN key 214 must first be pressed to inform the controller that a new program is about to be entered. As previously noted, the ACTION key 216 may be pressed at this point if the operator wants to observe the robot functions as the program is developed. At junction 218, the user has the option of selecting robot function keys 220, non-robot function and parameter keys 222, or to proceed to identify the mark home position via flow line 224 by depressing the MARK HOME key 226. After selecting and pressing an appropriate function key, the operator may then store the function in the user memory by pressing the ENTER key 228, or command the controller to disregard the function by pressing the CLEAR key 230. After defining the mark home reference position, the operator may continue to select further functions, or change the position in the program sequence by pressing either the ADVANCE key 232 or RECEDE key 234. Finally, by pressing the END key 236, the user will indicate the end of the program to the controller, and the operator may then exit the program mode. To enter the edit mode, the operator must depress the MODE key 202. Flow line 238 continues to FIG. 8, which is an operational flow diagram of the edit mode.

Referring now to FIG. 8, junction 240 indicates that the operator may continue in the edit mode, or proceed to the test-run mode via flow line 242. In the edit mode, the operator has a choice of five keys. If the EXAMINER STEP key 244 is selected and pressed, it must be followed by a three digit step number (indicated at 246). If the ENTER NEXT key 248 is selected and pressed, it must be followed by the normal programming sequence for entry of a single function described above. To exit the edit mode and simultaneously enter the test-run mode, the operator must press the MODE key 202. Flow line 250 continues to FIG. 9, which is an operational flow diagram of the test-run mode.

Referring to FIG. 9, the test-run mode flow diagram indicates that any of the keys in this group, described above, may be selected. Alternatively, the operator may proceed to the program mode via flow line 252. If the TEST-RUN key 254 is selected and pressed, the controller will execute the user program at the normal (auto-run) speed until the end of the program, or until the STOP key 256 is pressed. It should be noted that if the CLEAR key 230 is pressed during this mode, execution of the user program will begin at step number 000. If the JOG key 258 is selected and pressed, then one or more robot function or output keys 260 may be selected without altering the user program. For example, the jog feature could be employed by the operator for setting one or more of the mechanical stops on the robot. In order to return to the normal test-run mode, the operator must press the JOG key again.

Turning now to a description of the organization of the user memory (EAROM 58), each step of the user program requires seven bytes, as designated below:

(1) A marker (FF) to indicate the beginning of a step block;
(2) the step number (hexidecimal);
(3) the function (encoded); and
(4-7) the parameters, when needed (decimal or encoded).

Therefore, the user-memory is organized as follows:

| ADDR. | MARKER | STEP | FCN. | PARA.1 | PARA.2 | PARA.3 | PARA.4 |
|---|---|---|---|---|---|---|---|
| X | FF | 00 | XX | XX | XX | XX | XX |
| X+007 | FF | 01 | XX | XX | XX | XX | XX |
| X+00E | FF | 02 | XX | XX | XX | XX | XX |
| * | * | * | * | * | * | * | * |
| * | * | * | * | * | * | * | * |
| * | * | * | * | * | * | * | * |
| X+5DD | FF | FA | JUMP | 00 | 00 | 00 | 00 |

This type of organization makes it easy to find a step, function and parameters by searching the user memory for the occurrence of "FF" and then examining the next six locations. A register called the user memory pointer is used in all operations that access user memory. In the preferred embodiment, step number 250 contains a permanent function jump 000 which is used as a safety measure.

Each function is encoded into a byte having a unique value, such that during execution, the bits identify the type of function (robot or non-robot), the function identification number and how many parameter bytes follow. The byte is divided in eight bits, as follows:

Bits 0-3 for the function I.D. number;
Bit 4 for the type of function, "0" for non-robot function, and "1" for a robot function;
Bit 5-7 for the number of parameters. The function I.D. numbers in the preferred embodiment are encoded in hexidecimal as follows:

| Grip | 10 | Over C.W. | 14 |
| Release | 15 | Over C.C.W. | 19 |
| Extend | 11 | Mark Home | 06 |
| Retract | 16 | Test Jump | 81 |
| Up | 12 | Jump | 62 |
| Down | 17 | Output | 43 |

-continued

| Rotate In | 13 | Delay | 64 |
| Rotate Out | 18 | Multiaction | 25 |

The parameters are used only with the non-robot functions, except for mark home which does not require a parameter value. When parameter values are not needed, the four parameter bytes will contain 00. The following is an example of how several of the available functions would be stored in the user memory:

|  | FCN | P1 | P2 | P3 | P4 |
|---|---|---|---|---|---|
| Test Jump | | | | | |
| Jump to Step 239 if 110vac is Applied to Input Port 5 | 81 | 05 | 02 | 03 | 09 |
| Jump to Step 052 if 110vac is Applied to Input Port 8 | 81 | 08 | 00 | 05 | 02 |
| Jump | | | | | |
| Jump to Step 124 | 62 | 01 | 02 | 04 | 00 |
| Jump to Mark Home | 62 | 0F | 0F | 0F | 00 |
| Output | | | | | |
| Turn On Output Port 3 | 43 | 03 | 01 | 00 | 00 |
| Turn Off Output Port 1 | 43 | 01 | 00 | 00 | 00 |
| Delay | | | | | |
| Delay for 39.7 Seconds | 64 | 03 | 09 | 07 | 00 |
| Delay for 02.6 Seconds | 64 | 00 | 02 | 06 | 00 |
| Multiaction | | | | | |
| Grip | 25 | 10 | 00 | 00 | 00 |
| Down | 25 | 17 | 00 | 00 | 00 |

The following is an example of how a typical program would appear in user memory:

| MARKER | STEP | FCN. | PARA.1 | PARA.2 | PARA.3 | PARA.4 |
|---|---|---|---|---|---|---|
| FF | 00 | Grip # | 00 | 00 | 00 | 00 |
| FF | 01 | Output # | 05 | 01 | 00 | 00 |
| FF | 02 | Release # | 00 | 00 | 00 | 00 |
| FF | 03 | Mark Home # | 00 | 00 | 00 | 00 |
| FF | 04 | UP # | 00 | 00 | 00 | 00 |
| FF | 05 | Multi-Action # | Down # | 00 | 00 | 00 |
| FF | 06 | Rotate Out # | 00 | 00 | 00 | 00 |
| FF | 07 | Delay # | 02 | 09 | 05 | 00 |
| FF | 08 | Rotate In # | 00 | 00 | 00 | 00 |
| FF | 09 | Test Jump # | 05 | 00 | 09 | 05 |
| FF | 0A | Over C.W. # | 00 | 00 | 00 | 00 |
| FF | 0B | Extend # | 00 | 00 | 00 | 00 |
| FF | 0C | Jump # | 0F | 0F | 0F | 00 |

When a jump to the mark home step is selected, as in the last step of the example, the first three parameters will contain "OF OF OF" instead of the step number.

As the function and parameter keys are being pressed, they are encoded and stored in decoder/driver 136. When the enter key is pressed, the contents of the decoder/driver 136 are transmitted serially and stored in user memory (EAROM 58) at the current step.

As previously noted, at some point during programming, the operator must enter the mark home function. All functions preceding it will only be executed once to set up any initial conditions. The functions that follow are the work cycle portion of the program which is executed repetitively.

While the above description constitutes the preferred embodiment of the present invention, it will be appreciated that the invention is susceptible to modification, variation and change without departing from the proper scope and fair meaning of the accompanying claims.

What is claimed is:

1. An electronic controller and portable programmer system for a pneumatically-powered point-to-point robot having a plurality of cylinder means for performing a plurality of robot functions and valve means for controlling the supply of air to said cylinder means; comprising:

transducer means operatively associated with each of said cylinder means for sensing the pressure therein and producing an output signal in accordance therewith;

a controller connected to said valve means and including a microprocessor, read-only memory means for storing a main control program, nonvolatile solid-state memory means for storing a sequence of encoded robot functions forming a user program, output interface means for transmitting control signals to said valve means, and input interface means for receiving output signals from said transducer means; and a teach control programmer unit removably connected to said controller for entering, editing, and testing said sequence of encoded robot functions, including interface means for providing serial communication with said controller, a keyboard including a key dedicated to each of said plurality of robot functions, a digital display for indicating the step numbers and corresponding robot functions in said user program, and circuit means coupled to said interface means for decoding said keyboard and driving said display.

2. The electronic controller and portable programmer according to claim 1, wherein each of said output signals from said transducer means is operable to indicate the completion of a corresponding robot function.

3. The electronic controller and portable programmer according to claim 2, wherein said controller determines that one or more robot functions have been completed from a predetermined change in one or more of said output signals from said transducer means.

4. The electronic controller and portable programmer according to claim 3, wherein said controller advances to the next step in said user program after the completion of a robot function has been determined.

5. The electronic controller and portable programmer according to claim 4, wherein said user program includes one or more of a plurality of non-robot functions, such that said user program comprises a sequence of encoded robot and non-robot function, and said programmer unit keyboard includes a key dedicated to each of said plurality of non-robot functions.

6. The electronic controller and portable programmer according to claim 5, wherein said programmer unit keyboard includes an edit group of keys for editing said user program, a program group of keys for supervising the creation of said user program, a motion/execution group of keys for testing said user program, and a parameter group of keys for providing numerical parameter values in association with select ones of said non-robot function keys and said edit keys.

7. The electronic controller and portable programmer according to claim 6, wherein one of said non-robot function keys is operable in cooperation with said parameter keys to command said controller to delay the execution of the next step in said user program for a predeterminable time.

8. The electronic controller and portable programmer according to claim 6, wherein one of said non-robot function keys is operable to command said controller to execute a plurality of robot functions concomitantly.

9. The electronic controller and portable programmer according to claim 6, wherein one of said non-robot function keys is operable in cooperation with said parameter keys to command said controller to jump unconditionally to a predeterminable step in said user program.

10. The electronic controller and portable programmer according to claim 6, wherein one of said non-robot function keys is operable in cooperation with said parameter keys to command said controller to perform a conditional jump to a predeterminable step in said user program.

11. The electronic controller and portable programmer according to claim 6, wherein one of said non-robot function keys is operable in cooperation with said parameter keys to command said controller to generate a predetermined output signal on a selected output line of said output interface means.

12. The electronic controller and portable programmer according to claim 6, wherein one of said non-robot function keys is operable to designate the initial step in said user program representing the work cycle to be repeated.

13. The electronic controller and portable programmer according to claim 6, wherein one of said motion/execution keys is operable in a test mode to command said controller to execute a selected robot function without affecting said sequence of encoded robot functions and non-robot functions in said user program.

14. The electronic controller and portable programmer according to claim 6, wherein one of said motion/execution keys is operable to command said controller to execute selected robot functions as they are entered on said keyboard during the creation of said user program.

15. The electronic controller and portable programmer according to claim 6, wherein said programmer unit display includes visual indicator means for prompting keyboard entries during the creation of said user program.

16. The electronic controller and portable programmer according to claim 15, wherein said visual indicator means comprises a lamp which is activated when said controller expects a robot function to be entered on said keyboard, and a lamp which is activated when said controller expects a parameter value to be entered on said keyboard.

17. The electronic controller and portable programmer according to claim 1, wherein said programmer unit receives its electrical power from said controller through a serial communication cable connecting said programmer unit to said controller.

18. The electronic controller and portable programmer according to claim 1, wherein said non-volatile solid-state memory means is organized such that each of said steps in said user program requires at least six bytes of memory, including one byte for a marker indicating the beginning of a step block, one byte for a step number, one byte for an encoded robot function and three bytes for a parameter value.

19. The electronic controller and portable programmer according to claim 18, wherein said controller locates the next step in said user program by searching said non-volatile solid-state memory means for the occurrence of the next one of said marker bytes.

20. An electronic controller system for a pneumatically-powered point-to-point robot having a plurality of cylinder means for performing a plurality of robot functions and valve means for controlling the supply of air to said cylinder means; comprising:
transducer means operatively associated with each of said cylinder means for sensing the pressure therein and producing an output signal which is operable to indicate the completion of a robot function; and
a controller connected to said valve means and including a microprocessor, read-only memory means for storing a main control program, non-volatile solid-state memory means for storing a sequence of encoded robot functions forming a user program, input interface means for receiving output signals from said transducer means, and output interface means for transmitting control signals to said valve means generated by said controller in accordance with said user program for executing said sequence of encoded robot functions.

21. The electronic controller system according to claim 20, wherein said controller determines that one or more robot functions have been completed from a predetermined change in one or more of said output signals from said transducer means.

22. The electronic controller system according to claim 21, wherein said controller advances to the next step in said user program after the completion of a robot function has been determined.

23. In a control system for a pneumatically-powered point-to-point robot having a plurality of cylinder means for performing a plurality of robot functions and valve means for controlling the supply of air to said cylinder means, including microcomputer controller means for storing a sequence of robot functions forming a user program and transmitting control signals to said cylinder means in accordance with said user program for executing said sequence of robot functions, a portable teach control programmer unit removably connected to said controller means for entering, editing and testing said sequence of robot functions, comprising:
interface means for providing serial communication with said controller;

a keyboard having a key dedicated to each of said plurality of robot functions;

a digital display for indicating the step numbers and corresponding robot function codes stored in said user program; and circuit means coupled to said interface means for decoding said keyboard and driving said display.

24. The electronic controller and portable programmer according to claim 23, wherein said programmer unit keyboard includes an edit group of keys for editing said user program, a program group of keys for supervising the creating of said user program, a motion/execution group of keys for testing said user program, and a parameter group of keys for providing numerical parameter values in association with select ones of said non-robot function keys and said edit keys.

25. The electronic controller and portable programmer according to claim 23, wherein said user program includes one or more of a plurality of non-robot functions, such that said user program comprises a sequence of encoded robot and non-robot functions, and said programmer unit keyboard includes a key dedicated to each of said plurality of non-robot functions.

* * * * *

UNITED STATES PATENT AND TRADEMARK OFFICE
CERTIFICATE OF CORRECTION

PATENT NO. : 4,379,335
DATED : April 5, 1983
INVENTOR(S) : Kerry F. Kirsch et al.

It is certified that error appears in the above-identified patent and that said Letters Patent is hereby corrected as shown below:

Reference "Hamill et al." should be --Hamill III et al.--.

Column 13, line 55, "OF OF OF" should be --OF OF OF--.
Column 17, line 9, Claim 24, "23" should be --25--.

Signed and Sealed this

Twentieth Day of March 1984

[SEAL]

Attest:

Attesting Officer

GERALD J. MOSSINGHOFF

Commissioner of Patents and Trademarks